(12) United States Patent
Wilmot

(10) Patent No.: US 9,604,289 B2
(45) Date of Patent: Mar. 28, 2017

(54) LONG REACH SPINDLE DRIVE SYSTEMS AND METHOD

(71) Applicant: National Oilwell Varco, L.P., Houston, TX (US)

(72) Inventor: Wessley Jack Wilmot, Derbyshire (GB)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 195 days.

(21) Appl. No.: 14/315,441

(22) Filed: Jun. 26, 2014

(65) Prior Publication Data

US 2014/0308149 A1 Oct. 16, 2014

Related U.S. Application Data

(63) Continuation of application No. 12/596,498, filed as application No. PCT/GB2008/001278 on Apr. 11, 2008, now Pat. No. 8,888,419.

(Continued)

(51) Int. Cl.
*F04C 2/107* (2006.01)
*F04C 14/02* (2006.01)
(Continued)

(52) U.S. Cl.
CPC ............. *B23C 3/32* (2013.01); *B23B 41/12* (2013.01); *B23Q 5/045* (2013.01); *B24B 5/40* (2013.01);
(Continued)

(58) Field of Classification Search
CPC  F04C 2/1075; F04C 2240/10; F04C 2250/30; F04C 2/107; F04C 2/1071; F04C 14/02; F01C 1/101; F01C 5/04; B23C 3/32
See application file for complete search history.

(56) References Cited

U.S. PATENT DOCUMENTS 2,372,913 A 4/1945 Schmidt
2,583,429 A 1/1952 Johnson
(Continued)

FOREIGN PATENT DOCUMENTS

DE 2120133 A1 11/1972
JP S60150926 8/1985
WO 99/31389 A2 6/1999

OTHER PUBLICATIONS

PCT/GB2008/001278 International Search Report dated Aug. 7, 2008 (2 p.).

(Continued)

*Primary Examiner* — Mary A Davis
(74) *Attorney, Agent, or Firm* — Conley Rose, P.C.

(57) ABSTRACT

A tool (100) for working the internal bore of a tube comprises a motor (10), having a housing with a rotary output; a housing sleeve (14a) and shaft (22); a first bearing housing (16), having a rotatably journalled first spindle (102), mounted on the housing sleeve; and an end sleeve and shaft connected to a tool head. The motor output drives, along a common axis (1), the housing shaft, first bearing spindle, end shaft and tool head. A change mechanism (56,58) is in the tool head to change direction of said drive to transverse said common axis. An output (60) is adapted to receive a tool bit. Gauge means (18,18') is disposed on said tool head and is adapted, in use, to bear against the bore of the tube and maintain the tool head located radially with respect to the tube axis; and support means (24,24') is disposed on one or more of said housing shaft, first bearing housing and end sleeve adapted, in use, to bear against the bore of the tube and support the tool. A long length of tool can work the inside of long tubes.

19 Claims, 13 Drawing Sheets

Related U.S. Application Data

(60) Provisional application No. 60/925,080, filed on Apr. 18, 2007.

(51) Int. Cl.

| | | |
|---|---|---|
| *F01C 1/10* | (2006.01) | |
| *F01C 5/04* | (2006.01) | |
| *B23C 3/32* | (2006.01) | |
| *B23Q 5/04* | (2006.01) | |
| *B24B 5/40* | (2006.01) | |
| *B24B 33/02* | (2006.01) | |
| *B24B 39/02* | (2006.01) | |
| *B24B 41/04* | (2006.01) | |
| *B23B 41/12* | (2006.01) | |
| *E21B 4/02* | (2006.01) | |

(52) U.S. Cl.
CPC .............. *B24B 33/02* (2013.01); *B24B 39/02* (2013.01); *B24B 41/04* (2013.01); *E21B 4/02* (2013.01); *F01C 1/101* (2013.01); *F01C 5/04* (2013.01); *F04C 2/107* (2013.01); *F04C 2/1071* (2013.01); *F04C 2/1075* (2013.01); *F04C 14/02* (2013.01); *B23B 2215/72* (2013.01); *B23B 2220/123* (2013.01); *B23C 2270/18* (2013.01); *F04C 2240/10* (2013.01); *F04C 2250/30* (2013.01); *Y10T 408/03* (2015.01); *Y10T 409/30448* (2015.01); *Y10T 409/300616* (2015.01); *Y10T 409/303808* (2015.01); *Y10T 409/304424* (2015.01)

(56) References Cited

U.S. PATENT DOCUMENTS

| | | | |
|---|---|---|---|
| 3,037,429 A | 6/1962 | Schurger | |
| 3,084,631 A | 4/1963 | David | |
| 3,213,525 A | 10/1965 | Creighton et al. | |
| 3,499,830 A | 3/1970 | Haggerty et al. | |
| 3,547,798 A | 12/1970 | Haggerty | |
| 3,553,095 A | 1/1971 | Daniel | |
| 3,568,568 A | 3/1971 | Mahler | |
| 3,616,343 A | 10/1971 | Inoue | |
| 3,703,846 A | 11/1972 | Krafft | |
| 3,769,194 A | 10/1973 | Haggerty | |
| 3,896,012 A | 7/1975 | Buschbaum et al. | |
| 4,104,009 A | 8/1978 | Chanton | |
| 4,144,001 A * | 3/1979 | Streicher ............... | F04C 2/1075 418/153 |
| 4,250,371 A | 2/1981 | Haug et al. | |
| 4,376,020 A | 3/1983 | Andrews | |
| 4,391,547 A | 7/1983 | Jackson et al. | |
| 4,475,996 A | 10/1984 | Inoue | |
| 4,557,644 A | 12/1985 | Scepanovic et al. | |
| 4,772,246 A | 9/1988 | Wenzel | |
| 4,909,337 A | 3/1990 | Kochnev et al. | |
| 5,025,548 A | 6/1991 | Justesen | |
| 5,062,187 A | 11/1991 | Bromley | |
| 5,184,927 A | 2/1993 | Judy | |
| 5,240,360 A | 8/1993 | Esser | |
| 5,417,281 A | 5/1995 | Wood et al. | |
| 5,611,397 A | 3/1997 | Wood | |
| 5,664,917 A | 9/1997 | Judy | |
| 5,759,019 A | 6/1998 | Wood et al. | |
| 6,019,583 A | 2/2000 | Wood | |
| 6,183,226 B1 | 2/2001 | Wood et al. | |
| 6,230,823 B1 | 5/2001 | Sieniawski | |
| 6,543,132 B1 | 4/2003 | Krueger et al. | |
| 6,568,076 B2 | 5/2003 | Bottos et al. | |
| 6,644,358 B2 | 11/2003 | Demarest et al. | |
| 6,716,008 B1 * | 4/2004 | Kachele ................ | F04C 2/1075 418/153 |
| 6,905,319 B2 | 6/2005 | Guo | |
| 7,207,751 B2 | 4/2007 | Feddersen | |
| 8,523,545 B2 * | 9/2013 | Wilbourn ............... | F04C 2/1075 418/48 |
| 8,888,419 B2 * | 11/2014 | Wilmot .................... | B23C 3/32 409/132 |
| 9,228,585 B2 * | 1/2016 | Kachele ................ | F04C 2/1075 |
| 2003/0089621 A1 | 5/2003 | Anderson et al. | |
| 2005/0079083 A1 | 4/2005 | Lievestro et al. | |
| 2005/0169719 A1 | 8/2005 | Feddersen | |
| 2006/0131079 A1 * | 6/2006 | Bottos .................... | F04C 2/1075 175/107 |

OTHER PUBLICATIONS

U.S. Office Action (Restriction Requirement) dated Oct. 1, 2013; U.S. Appl. No. 12/596,498 (6 p.).

Response to Restriction Requirement Dated Oct. 1, 2013; U.S. Appl. No. 12/596,498; Response dated Oct. 31, 2013 (11 p.).

U.S. Office Action dated Nov. 26, 2013; U.S. Appl. No. 12/596,498 (6 p.).

U.S. Response to Office Action Dated Nov. 26, 2013; U.S. Appl. No. 12/596,498; Response dated Feb. 26, 2014 (12 p.).

U.S. Notice of Allowance dated Mar. 26, 2014; U.S. Appl. No. 12/596,498 (7 p.).

* cited by examiner

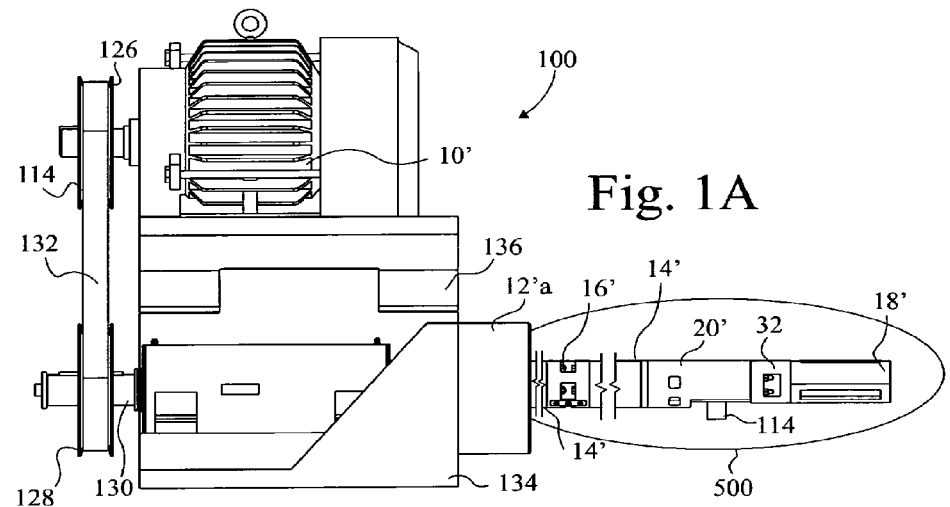
Fig. 1A
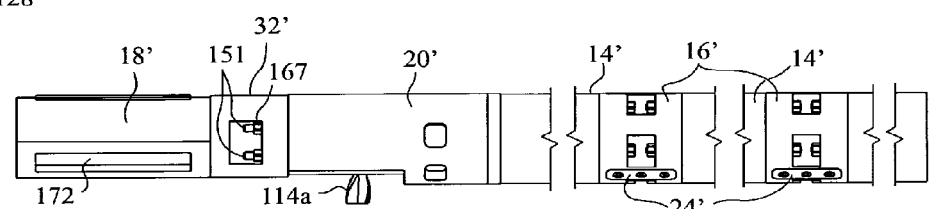
Fig. 1B
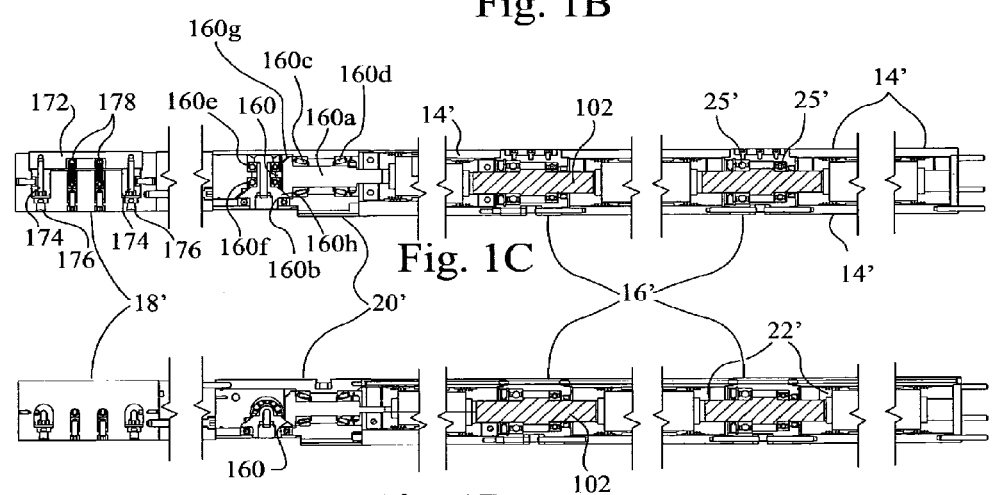
Fig. 1C
Fig. 1D

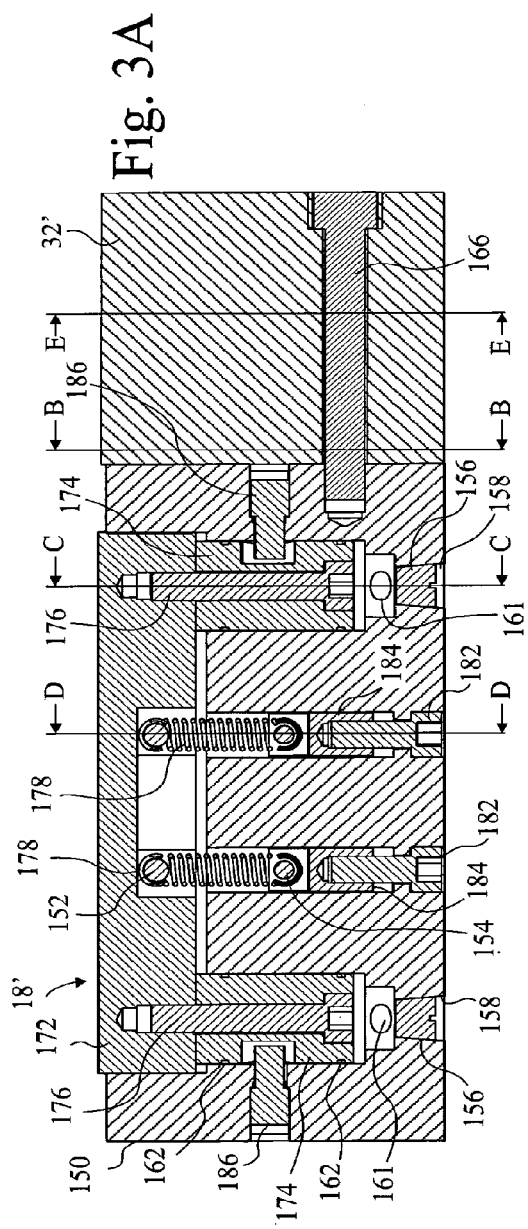

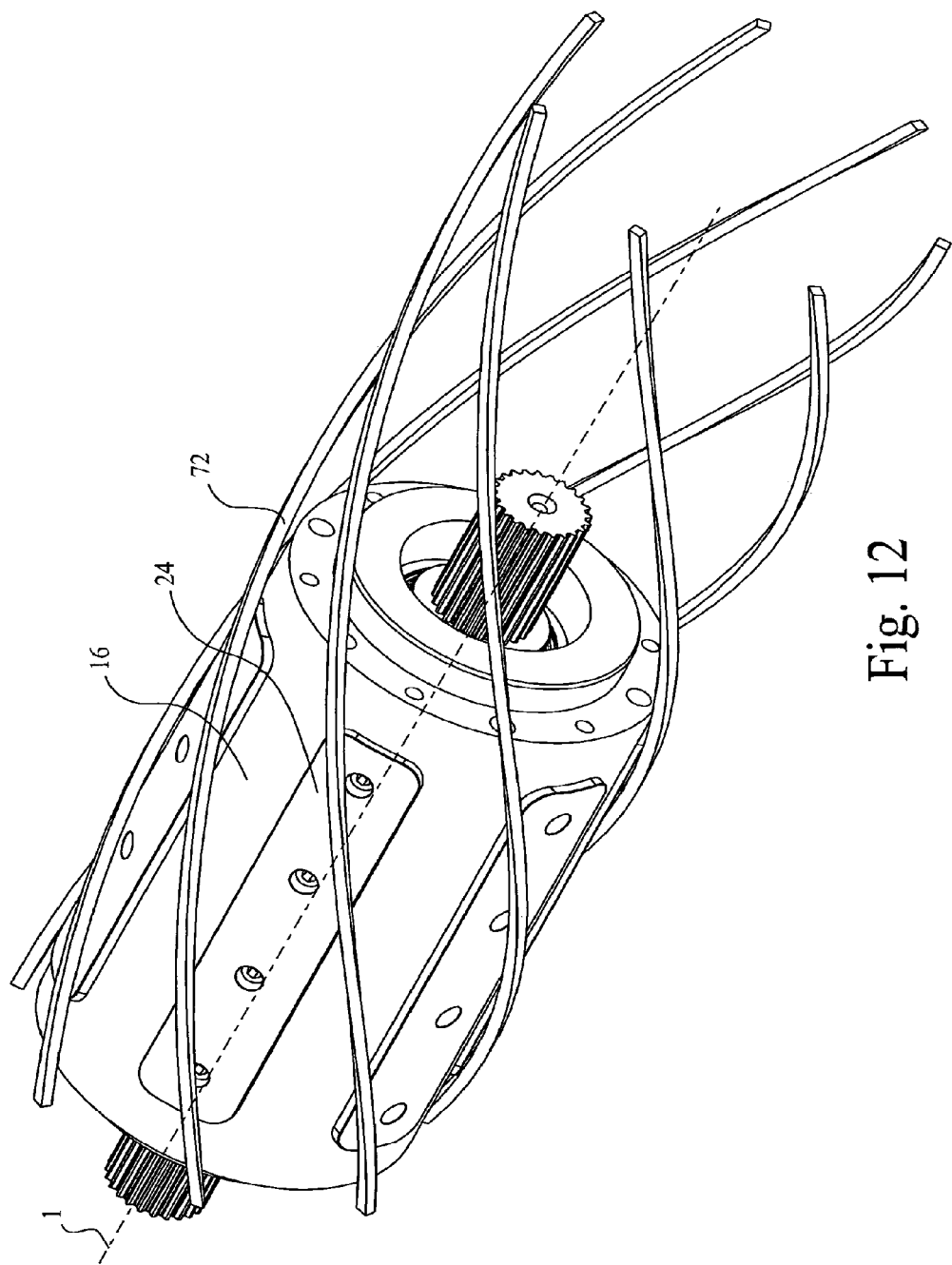

US 9,604,289 B2

LONG REACH SPINDLE DRIVE SYSTEMS AND METHOD

CROSS-REFERENCE TO RELATED APPLICATION

This application is a continuation of U.S. application Ser. No. 12/596,498 filed Dec. 10, 2009, entitled "Long Reach Spindle Drive Systems and Method," which is a 35 U.S.C. §371 national stage application of PCT/GB2008/001278 filed 11 Apr. 2008 and further claims the benefit of U.S. Provisional Application Ser. No. 60/925,080 filed 18 Apr. 2007. Each of the foregoing are hereby incorporated herein by reference.

STATEMENT REGARDING FEDERALLY SPONSORED RESEARCH OR DEVELOPMENT

Not Applicable.

This invention relates to systems and methods for material conditioning, material treatment, and material removal, including, but not limited to, polishing, burnishing, surface treatment, grinding, milling and drilling; and, in certain particular aspects, to systems in which power is applied to a tool spindle that is inclined inside a workpiece at an angle to an axis of a spindle arm. The invention is particularly concerned with the machining of spiral grooves inside tubes ultimately forming the stators of mud motors used in the oil and gas exploration industry, and pumps used in a variety of applications.

BACKGROUND OF THE INVENTION

The prior art discloses a variety of conventional extended reach right-angle machining systems, some of which have a limited reach (e.g. about one meter or forty inches) and a large external size (e.g. about thirteen centimeters or five inches) for certain applications in removing material internally from a member. Certain prior systems with an extended reach spindle arm made from a single piece shaft and housing have problems due to resonance and vibration, and due to various disadvantages in methods for making such systems.

Certain conventional right-angled machining head designs are suitable for a variety of applications, but some systems with a reach of over forty inches perform ineffectively. The shaft size of some prior systems results in a relatively long shaft with bearing supports at either end which has a low critical speed. Bending or sag in the shaft system can produce whipping of the shaft at even low speeds. One piece shaft arrangements can have a small cross-sectional area due to housing size and bearing location diameter, which can limit torque and reduce torsional stiffness. Often balancing a relatively long one-piece shaft for operation at high rpm's can be impractical. Since torsional stiffness is required to prevent fatigue, and if cyclic vibration is transmitted to a spindle head, oscillations in the spindle of certain prior systems reduces tool bit life and spindle head life.

Manufacturing a shaft in one piece can create significant production problems with machining accuracy (e.g. regarding concentricity, circularity, straightness, and parallel locating faces). Differential thermal expansion of a relatively long shaft and housing can cause excessive loads on bearings or promote whipping during operation. With certain relatively long shafts, there are difficulties in providing auxiliary services to a cutting head on the shaft, e.g. providing cooling/lubricating oil for a gearbox; providing coolant for machining tool; and swarf removal.

The prior art discloses a variety of systems for material removal, e.g., but not limited to, as disclosed in and referred to in U.S. Pat. Nos. 2,372,913; 3,037,429; 3,568,568; 5,025,548; 5,240,360; 5,664,917; and German Patent No. DT 2,120,133—all incorporated fully by reference herein for all purposes.

The prior art discloses a wide variety of downhole motors, mud motors, power sections, artificial lift progressive cavity pumps, industrial progressive cavity pumps, parts thereof, and methods for making them, including, but not limited to, those in U.S. Pat. Nos. 3,084,631; 3,499,830; 3,547,798; 3,553,095; 3,616,343; 3,769,194; 3,896,012; 4,104,009; 4,250,371; 4,376,020; 4,391,547; 4,475,996; 4,772,246; 4,909,337; 5,417,281; 5,611,397; 5,759,019; 6,019,583; 6,183,226; 6,230,823; 6,568,076; 6,644,358; 6,905,319; and in U.S. Patent Application Nos. 20050079083 published Apr. 14, 2005; and 20030089621 published May 15, 2003—all said patents and applications incorporated herein fully by reference for all purposes.

There is a need, recognized by the present inventors, for an effective and efficient long reach system for material surface conditioning, surface treatment or removal of material from inside a member and, in particular, a system and method for forming a stator for a downhole motor and the internal structure of such a stator.

SUMMARY OF THE PREFERRED EMBODIMENTS

In accordance with the present invention there is provided a system and method for material processes including, but not limited to, material conditioning processes and material removal inside a member; and, in certain aspects, systems and methods with a powered spindle to perform primary surface conditioning or treatment processes or material removal processes, e.g., polishing, burnishing, grinding, milling and drilling. In certain aspects, these systems and methods provide such operations with a long reach powered spindle movable in a straight/helical path or on a contoured path inside a workpiece.

In certain aspects, such systems and methods use an apparatus in which rotary power is provided to a spindle arm connected to a tool spindle which is inclined at an angle negative or positive from the perpendicular or equal to the perpendicular of the axis of the spindle arm.

It is, therefore, an object of at least certain preferred embodiments of the present invention to provide new, useful, unique, efficient, non-obvious systems and methods for surface conditioning or for removing material from within a member.

It is, therefore, an object of at least certain preferred embodiments of the present invention to provide new, useful, unique, efficient, non-obvious systems and methods for removing material from within a member to form a stator for a downhole motor.

It is, therefore, an object of at least certain preferred embodiments of the present invention to provide new, useful, unique, efficient, non-obvious systems with long reach powered spindles.

THE INVENTION

In accordance with the present invention, there is provided a tool for working the internal bore of a tube having a tube axis, the tool comprising:

a) a motor, having a housing with a rotary output;
b) a housing sleeve, connectible at a proximal end thereof to the housing of the motor around the output;
c) a housing shaft, disposed in the housing sleeve, having a proximal end connectible to said output;
d) a first bearing housing, having a rotatably journalled first spindle, a proximal end of said first bearing housing being mountable on a distal end of the housing sleeve and a proximal end of said first spindle drivingly connectible to said shaft;
e) an end sleeve, connectible at a proximal end thereof to a distal end of said first bearing housing around the first spindle;
f) an end shaft disposed in the end sleeve;
g) a tool head, connectible at a proximal end thereof to a distal end of said end sleeve around the end shaft and a rotary input of the tool head drivingly connectible to the end shaft, said motor output driving, along a common axis, the housing shaft, first bearing spindle, end shaft and tool head input;
h) a change mechanism in said tool head to change direction of said drive to transverse said common axis;
i) an output of said tool head adapted to receive a tool bit;
j) gauge means disposed on said tool head adapted, in use, to bear against the bore of the tube and maintain the tool head located radially with respect to the tube axis;
k) a tool bit on the tool head output; and
l) support means disposed on one or more of said housing sleeve, first bearing housing and end sleeve adapted, in use, to bear against the bore of the tube and support the tool.

PREFERRED FEATURES OF THE INVENTION

Where features below are discussed as being "preferable", "convenient", or present "in one embodiment", or that they "may" be present, these qualifications are to be given their natural meaning, as a reader would expect, that the features in question are not necessarily essential to the invention, in its broadest terms, but are optional.

Preferably, the housing sleeve is spaced apart from said end sleeve by said first bearing housing and at least one intermediate sleeve and at least one intermediate bearing housing; each said intermediate bearing housing having a rotatably journalled intermediate spindle and each intermediate sleeve having an intermediate shaft disposed therein. Each spindle may be rotatably journalled within its bearing housing by bearings.

Said bearings preferably have an outer diameter ($D_B$) and an inner diameter ($D_{BI}$) and the difference ($D_B$–$D_{BI}$) between said outer and said inner diameters is between 10 and 30% of said outer diameter, and the ratio (R), of bearing outside diameter ($D_B$) to bearing housing outside diameter ($D_H$) is between 30 and 60%. For reasons more fully explained below, such thin bearings are found advantageous because the thrust loads, both axially and radially are relatively small, whereas their diameter should be large in order to enhance torsional stiffness of the element carried by the bearings. Also, large bearings require more preload in order to reduce free play, whereas the present bearings preferably allow a certain axial freedom of movement to accommodate thermal expansion.

Said support means preferably comprises a plurality of contact plates affixed to an exterior surface of each bearing housing. The radial distance from the exterior of said contact plates to said axis may be greater than the radial distance from the exterior surface of said bearing housing to said axis, and may also be greater than the radial distance from the exterior surface of each sleeve to said axis. Each bearing housing is preferably mountable to each sleeve through a cylindrically mating face thereof and secured by axially disposed bolts, said bolts being accessible via recesses in said exterior surface of said bearing housing or sleeve. Said recesses may receive said contact plates which close said recesses rendering said bolts inaccessible when said contact plates are affixed in place on said exterior surface of said bearing housing.

The bearing housing, sleeve and tool head preferably comprise cross-drilled passageways that are in fluid communication with one another when said tool is assembled. These may be used to supply fluid to said tool head, perhaps to cool said tool head and/or, if the fluid is pressurised, so as to displace waste material away from said tool when said tool is in operation. The fluid may be a lubricant. Thus the fluid is either gaseous or liquid. Indeed, there is no reason why there may not be two sets of passages, one delivering pressurised gas for displacing cuttings or other waste material removed from the bore of the tube, and another comprising cutting fluid to lubricate the tool bit and wash away cuttings.

Alternatively, or in addition, electrical connections may pass through the cross-drilled passageways to provide power to sensory equipment disposed in said tool head. This might be desirable in order to detect numerous conditions, including fault conditions, whereby machining or other processing that is being effected by the tool may be modified or halted.

Said change mechanism preferably comprises first and second bevel gears; wherein
    said first bevel gear rotates about said common axis and is drivingly connectible to said rotary input, and
    said second bevel gear engages with said first gear and rotates about said transverse axis, said second gear being drivingly connectible to said tool head output.

Indeed, the tool head may comprises first and second members connected together, and wherein said first bevel gear is rotatably disposed in said first member, which first member is connected to said end sleeve, and wherein said second bevel gear is rotatably disposed in said second member, which second member is connected to said first member.

In most cases said transverse axis is perpendicular to said common axis. However, clearly it may be inclined, and, indeed, this may be preferable in some situations, examples of which are explained further below.

The locations of said first and second gears are adjustable in their respective axial directions by adjusting means. Preferably, they are spiral bevel gears that benefit from precise location of one with respect to the other. The adjusting means permits fine tuning of their respective positions so that backlash can be eliminated. Said adjusting means may comprise a shim for each gear. Shims are easily replaced or machined to high precision.

In one embodiment, said gauge means is disposed intermediate said end sleeve and said tool head, or on said tool head between said end sleeve and said tool output. In this event, said gauge means may comprise a wear pad in a gauge means housing and an actuator for pushing the wear pad against said bore of the tube. The actuator may comprise at least two pistons driven by fluid pressure, and the wear pad may be retracted by at least one compression/tension spring.

In another embodiment, said gauge means is disposed on an end of said tool head distal said end sleeve. Then, said gauge means may comprise a gauge means housing and a plurality of gauge elements within said gauge means housing, each element being in the form of a ball bearing disposed in a socket clamped in said gauge means housing.

At least one gauge element may have its ball bearing resiliently displaceably mounted on a spring, said spring being disposed within said socket, and being capable of radial translation, the remainder of said ball bearings being radially static.

Said radially static ball bearings may also be loaded onto springs via cups receiving said ball bearings, said radially static ball bearings being prevented from moving radially by grub screws disposed in said cups.

Indeed, said elements may all have the same construction and said ball bearings (those which are capable of radial translation) may be capable by virtue of the disposition of said grub screws in the cups, which grub screws alter the effective depth of the cups in said gauge means housing, whereby they are selectively clampable against the base of the gauge means housing by the sockets to render selective ball bearings static.

One or more of said radially static ball bearings contacts said bore of the tube in opposition to said tool bit, when said tool is in operation. This provides rigid support for the tool. Ideally, one or two other ball bearings are also static to resist torsional movements, transverse to both the common axis and transverse axis of the tool, caused by reaction of the rotating tool bit. Thus it might be that a quadrant of the envelope surrounding the tool bit is supported by radially static ball bearings, but that the remaining three quadrants are supported by resiliently displaceable ball bearings so that variation in the internal profile of the tube being machined can be accommodated without the tool getting stuck.

While the term "ball bearings" is employed herein, it is feasible that other spherical ended elements (bullet-shaped components) or even rollers (eg barrel-shaped elements) could be employed and the term should be construed accordingly.

Said tool head preferably comprises a tool plate having said tool head output and an adaptor plate connectible to said end sleeve, said tool plate and adaptor plate being connectible together in a plurality of angular positions with respect to each other about said common axis, and said gauge means housing has the form of a sleeve disposed on said adaptor plate.

Preferably, said gauge means is clamped to said adapter plate by a plural number m of screws passing through arcuate slots having a minimum circumferential extension of p° in a first flange of said gauge means housing, each said screw being circumferentially separated from the next by $(360/m)°$ with respect to said common axis. m is conveniently four. p is conveniently 22.5°. Incidentally, the term "circumferential extent" is used herein to mean the degree of rotation that the slot permits, given the thickness of the screws.

Said gauge means may be arranged such that said ball bearings as a whole are disposable in any angular orientation with respect to said adapter plate. Such arrangement may comprise the extent of said radial slots in said first flange and the angular disposition of the gauge elements around the gauge means housing. Thus by loosening the screws, the gauge means housing can be rotated about the common axis to a different angular position of the gauge elements with respect to the end sleeve and the adaptor plate connected thereto.

Preferably, there are x in number of gauge elements evenly spaced around said gauge means housing and in which said arrangement is that the minimum circumferential extension of the arcuate slots in said first flange is given by $p=(360/f_1(m,x))°$, where $f_1(m,x)$ is a function of m and x giving the number of different orientations of the gauge elements with respect to the adaptor plate, given m screws and x gauge elements. In the event that there are, for example, seven gauge elements and four screws, there are twenty-eight different angular orientations of the gauge elements with respect to the end sleeve without any slot in the flange giving rotational freedom. Consequently, where said gauge means comprises seven gauge elements evenly spaced around said common axis and four screws through said first flange, the circumferential extent of each said arcuate slots is at least about 12.9°. However, if there are an evenly divisible number of gauge elements, say eight, and four screws, then rotating the gauge housing with respect to the adaptor plate can do nothing to alter the relative angular positions of the individual gauge elements. Consequently, the extent of the arcuate slots (45°) is determined by the number of gauge elements only. Where there are six gauge elements and four screws, then there are twelve orientations, requiring 30° slots.

Preferably, said gauge means is clamped to said tool plate by a plural number n of screws passing through arcuate slots having a minimum circumferential extension of q° in a second flange of said gauge means housing, each said screw being circumferentially separated from the next by $(360/n)°$ with respect to said common axis.

Said gauge means is preferably arranged such that said tool plate is disposable in any angular orientation with respect to said adapter plate. Said arrangement may comprise the extent (p, q) of said circumferential slots in said first and second flanges and the number of screws (m, n) employed to secure said first and second flanges. The circumferential extent (q) of said slots in said second flanges depends on a number of factors, including the extent (p) of the circumferential slots in said first flanges, the number of different orientations possible between the tool head 20, steady apparatus 18 and the adaptor plate 32.

Conveniently, the circumferential extents (p and q) of said slots in said first and second flanges are the same.

In another aspect, the invention provides a method of working the internal bore of a tube using a tool as defined above, the method comprising the steps of:
  i) assembling the tool;
  ii) disposing the tool in the bore of tube, which tube is arranged so that, when disposed therein, said gauge means bear against the bore of the tube and maintain the tool head located radially with respect to the tube axis and the support means bear against the bore of the tube and support the tool;
  iii) disposing the tool bit on the tool head output;
  iv) operating the motor and driving the tool through the tube whereby the tool bit works on the bore of the tube.

Preferably, said tool bit is one of a selection of milling tool bits, said tool bits of the selection each having different dimensions for machining grooves inside said tube, each groove being separated by a corresponding lobe. Of course, if other operations, such as polishing or grinding is to be effected, the tool bit is selected accordingly.

Said bore is preferably worked by each tool bit of said selection in a series of working passes. A multitude of parallel grooves may be milled from said bore by each tool bit of said selection. The tube may be rotated and translated axially when said tool bit works on said bore. In that way, helical grooves are formed in the tube. However, it is preferable from a number of perspectives to merely rotate the tube and to translate the tool. This has several advantages. The tool bit has a constant angular position with respect to gravity, so that cuttings can be arranged to fall so that they do not foul a subsequent cutting action of the tool bit. The arrangements to adjust both dimensions precisely in the same component is more complex than adjusting only one each for two components.

Step ii) is preferably performed before step iii), the tool head projecting through and beyond the end of the tube and, during step iv) the tool being drawn back through the tube so that it operates under tension. This serves also to straighten any misalignment, keeping the integrity of the common axis.

The gauge means is preferably arranged such that said ball bearings locate on said lobes of said bore when said tool is in operation. During step ii), said ball bearings may score the bore of said tube as the tube is positioned onto said tool forming tracks on said lobes subsequently to be formed during step iv). In the event that helical grooves are being cut, it is desirable that the tube is rotated as the tool is inserted such that said scoring forms helical tracks that will be followed during the subsequent machining when the tool is drawn through the tube.

The method of the present invention finds particular application in the manufacture of the stator of progressive cavity pump or motor. Indeed, in that respect, preferably:

said tool bit is one of a selection of milling tool bits, said tool bits of the selection each having different dimensions for machining grooves inside said tube, each groove being separated by a corresponding lobe;

said bore is worked by each tool bit of said selection in a series of working passes;

a multitude of parallel grooves are milled from said bore by each tool bit of said selection;

said tube is rotated and translated axially when said tool bit works on said bore; and said selection of milling tool bits progressively increase in radial extension but decrease in circumferential extension, whereby stepped helical grooves are formed in said stator, a final milling tool bit comprising a shaped bit whereby the stator is provided with a sinusoidal sectional profile.

The term "sinusoidal" is not used herein in any mathematical sense but purely in a qualitative sense meaning wavy. Indeed, in one embodiment, the shape is generated by intersecting alternating circles of different diameters.

In yet another aspect, the present invention provides a stator for a mud motor, for another progressive cavity motor, or for a progressive cavity pump, made by a method as defined above. Such a stator is characterised by machining marks, in particular scores on the lobe crowns. Indeed, in the field of progressive cavity motors and pumps, the skilled reader will be aware that the internal surface of the stator is coated with elastomeric material in order to reduce the effect of impacts with the rotor of such motors and the effects of solid material trapped between the rotor and stator. Thus uneven surface of the underlying metal, for example in the form of indentations where the gauge means press, can assist adhesion of the elastomeric layer.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to cover this invention no matter how others may later disguise it by variations in form or additions of further improvements.

The tube whose bore is worked by the arrangements described above does not necessarily have a round outside diameter. It could be square or have any convenient or preferred profile suited to the particular application.

BRIEF DESCRIPTION OF THE DRAWINGS

Embodiments of the invention are further described hereinafter with reference to the accompanying drawings, in which:

FIG. 1A is a side view of a first embodiment of the long reach spindle drive system;

FIG. 1B is an enlarged side view of part of the system of FIG. 1A;

FIG. 1C is a cross-section view of the part of the system of FIG. 1B;

FIG. 1D is a cross-section view of the part of the system of FIG. 1B;

FIG. 3 is an end view of an internal steady apparatus of the system of FIG. 1A;

FIG. 3A is a cross-section view along line A-A of FIG. 3;

FIG. 3B is a cross-section view along line B-B of FIG. 3A;

FIG. 3C is a cross-section view along line C-C of FIG. 3A;

FIG. 3D is a cross-section view along line D-D of FIG. 3A;

FIG. 3E is a cross-section view along line E-E of FIG. 3A;

FIG. 12 is a perspective view of the bearing housing of FIG. 7 with paths of the lobes illustrated.

DETAILED DESCRIPTION OF THE PREFERRED EMBODIMENTS

Figure 1E:
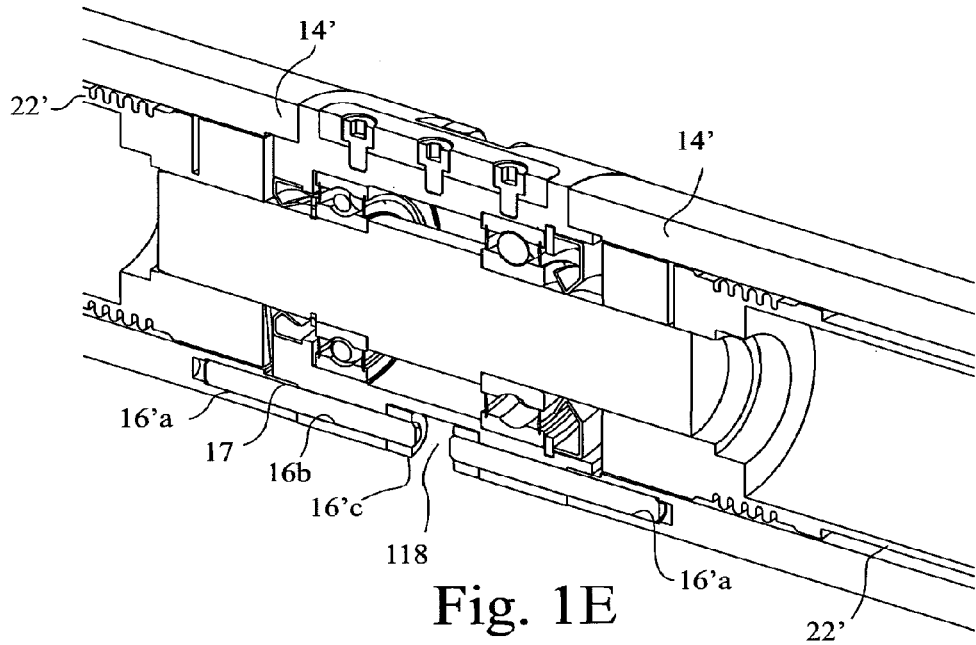
FIG. 1E is a perspective view of part of the system of FIG. 1A.
Figure 1F:
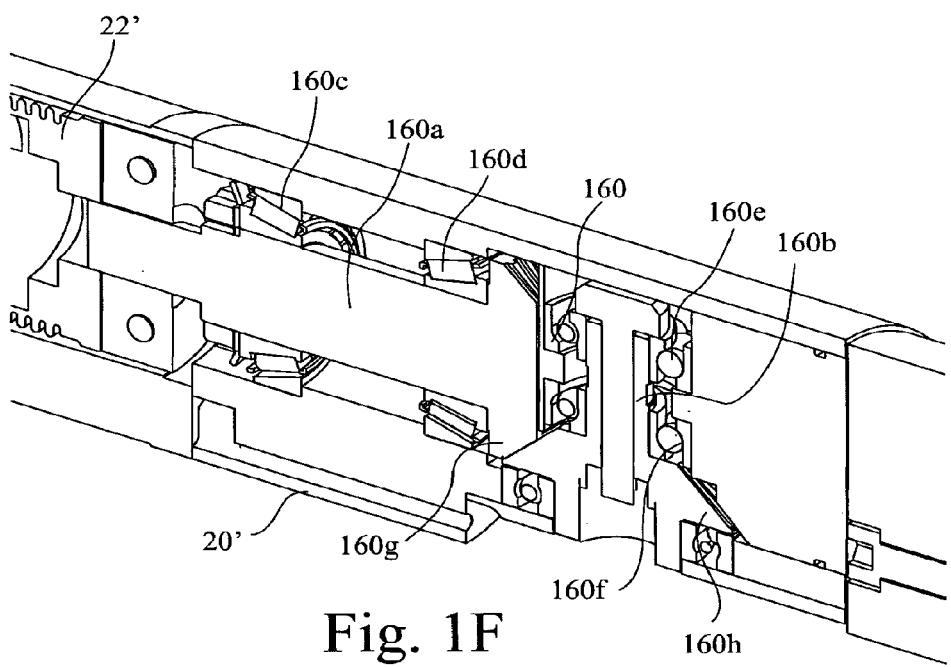
FIG. 1F is a perspective view of part of the system of FIG. 1A.

FIGS. 1A-1H show a system 100 according to the present invention. The system 100 includes a motor 10' that drives a pulley 126 that, through a belt 132, drives a further pulley 128 mounted on a shaft 130 journalled in a base frame 134. The shaft 130 is journalled through a clamp assembly 12'a in which is clamped a proximal end of a spindle arm assembly 500. The assembly 500 comprises a first extension tube 14'. A bearing housing 16' is mounted on a distal end of the first extension tube 14' and further extension tubes 14' may be mounted on the other (distal) end of the bearing housing 16'. As many extension tubes 14' and bearing housings 16' are provided as is required to achieve a particular overall length of the spindle arm assembly 500.

Bearing housings 16' each rotatably mount a plane shaft 102 and support between them line shafts 22' within the extension tubes 14'. A first line shaft 22' is mounted on and driven by the shaft 130. A spindle head 20' is mounted on the most distal extension tube 14', and is provided with an adaptor plate 32' and a steady apparatus 18'. The item labelled with the numeral 114 indicates any tool, head, or attachment used for a process or method according to the present invention for material treatment or for material removal. As shown in FIG. 1B, this is a cutter head 114a.

The system 100 is mounted on the base 134. A motor mount 136 (see FIGS. 1E,F) is hingedly connected to the base 134 for tension adjustment of the belt 132.

In certain embodiments, the present invention provides a spindle attachment mountable onto a variety of existing machine tools or it is used for the main surface treatment or cutting process for a machine built specifically with such a spindle. These machines, in certain aspects, provide their own power, e.g. with an electric motor. In certain particular embodiments a long reach spindle drive system according to the present invention is mounted on a bed, mount, carriage, or slide so that the system's relative center height is adjustable (e.g. in one aspect between on center and a limit of travel available in the associated axis). The electric motor provides rotary motion through the power take off unit which mounts and houses the motor (a prime mover) and allows for tensioning adjustments when a timing belt is used. A driven timing belt pulley 128 is rigidly held by a bearing assembly and shaft 130 arrangement that provides the output to a spindle transmission on an opposing side.

In certain aspects, one half of a bellows coupling integrated into the line shaft with a tapered press fit connection at either end of the shaft is provided on the output of the system 100 (power take-off "PTO" unit). Thus any device requiring rotary motion can be coupled to the unit, if the same press fit taper connection is attached and positioned on the equipment requiring power.

In certain aspects different size spindle arms are interchangeable with the PTO unit. The "spindle arm assembly" indicated by the numeral 500 is a collective term used to describe the sub assemblies that enable a machining operation, including components from the clamp assembly on a PTO to a steady end of a spindle arm (including, in some aspects, a spindle head, an adaptor plate, and a steady apparatus). Optionally a torque limiter is integrated into a first part of a line shaft from the PTO unit to prevent an overload situation and thus prevent damage to components down the transmission line.

A line shaft (see, e.g. the line shafts 22', FIG. 1D) spans the distance between bearing housings 16'; and also provides torsionally stiff torque transmission with allowances for axial and angular misalignments. Suitable line shafts 22' include commercially available line shafts. The line shafts 22' are provided with internal gimbals to increase the operational rotational speed before a critical limit is reached. The (first, most proximal) input line shaft 22' is unsupported at a connection end, and all support is taken from the PTO unit and the taper fit clamp coupling 12'a. This line shaft 22' spans to the next bearing housing 16' where theplane shaft 102 allows the line shaft 22' to be connected with an integrated clamping system (not shown, but see below).

An assembly 500 with bearing housings 16' and extension tubes 14' has a cross-section to suit the internal size of the workpiece, and an external size equal to or less than the internal size and shape of the workpiece being machined.

Figure 2A:
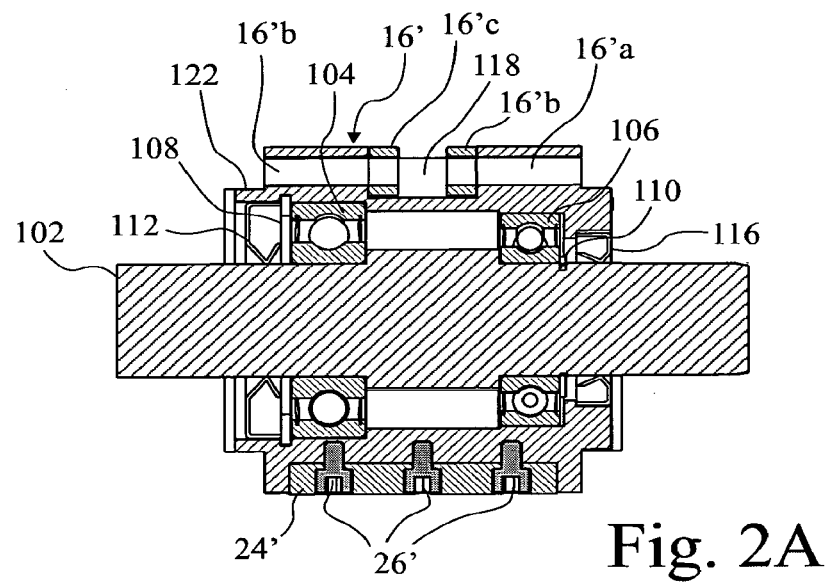
FIG. 2A is a cross-section view of a bearing housing of the system of FIG. 1A.

Each extension section 14' has recesses internally machined at both ends that are concentric within very close limits. These features provide the location for internal diameters 122 of bearing housings 16' for keeping extension modules concentric. An "extension module" includes the components for completing one span before being repeated once again to increase spindle arm length, e.g. extension tube 14', plus its line shaft 22', plus bearing housing 16' and its shaft 102. The concentricity is with reference to e.g. the spindle head 20' and PTO 100, and all components between them. The bearing housing 16' supports the shaft 102 on bearings 104, 106. Bearing retainers 108, 110 hold the bearings 104, 106, in place. Seals (see, e.g. seals 112, 116, FIG. 2A) are installed at either end of bearing housing shafts 102 to prevent the ingress of dirt or contaminants.

Figure 2B:
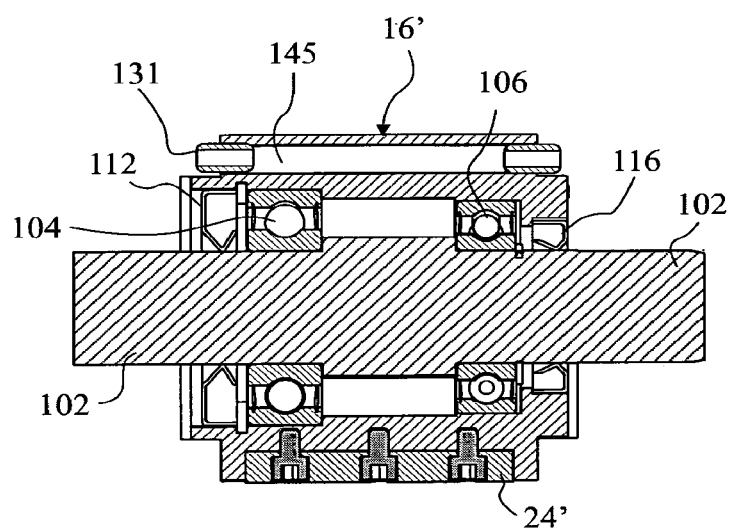
FIG. 2B is a cross-section view of a bearing housing of the system of FIG. 1A.

An array of tapped holes 16'a on a PCD (pitch circle diameter) of the extension tubes 14' have threaded studs 17 installed that provide clamping between the bearing housings 16' and extension tubes 14' by use of nuts 16'c. Nuts 16'c are partially received in a nut recess 118. The bearing housings 16' are also cross drilled with passages 145 (see FIGS. 1D and 2B) at as many locations as needed to provide auxiliary services to the spindle head (e.g. compressed air/oil/electrical wire passageways, etc.) and sealing features are provided at both ends to ensure no loss of fluid (air/liquid). Likewise, longitudinal bores are provided down the length of the extension tubes 14' connecting with the cross drillings of bearing housings 16' to complete a communication path from the motor assembly 100 to the spindle head 20'. A seal 131 seals the extension tube passageway and the bearing housing by compression between the bearing housing and extension tube.

The cross drilled passageways 145 connected through the tubes 14' and bearing housings 16' may be used for supplying cooling air to the spindle head 20' and to blow waste material clear of the tool to prevent the machining process from re-processing the waste material that would decrease tool bit life and increase power requirements. Lubricants may also be supplied to the spindle head 20', to keep running temperatures at an acceptable level and ensure adequate lubrication is provided throughout its running life. Electrical connections can be passed through to the spindle head 20' to connect transducers to measure torque/vibration or angle of twist of the assembly due to machining torque, or any other form of electrical control required at the head. In certain aspects, the spindle head 20' has an input/output ratio that suits optimum process requirements required for spindle speed and torque.

Each bearing housing 16' (see also FIGS. 2A and 2B) provides a rigid intermediary support for the line shaft 22' keeping it straight, and preventing whipping or other harmonics being set up in the system. The housings 16' locate on the internal surface of a workpiece, which itself can be externally clamped. The housings 16' share a common axis with bearings 25' therein and shaft 22', ultimately keeping the line shaft 22' rotating on the axis of the spindle arm assembly 500.

Contact plates 24' (FIGS. 1B and 2B) can be screwed with screws 26' into the exterior of the housings.

The spindle head 20' includes a drive 160 that takes the motion from the line shaft sections 22' and changes the axis of rotation (incline the angle positive or negative up to perpendicular) to suit the process. The drive 160 includes shafts 160a and 160b and bearings 160c-160f. The shaft 160a has a spiral bevel gear 160g which drivingly meshes with a spiral bevel gear 160h on the shaft 160b.

A tool holding system that is a single modular unit may be used, although this is not illustrated. Such a modular unit fastens in much the same way as the bearing housings 16', by using a recessed slot with stud and bolt fastening.

Figure 3F:
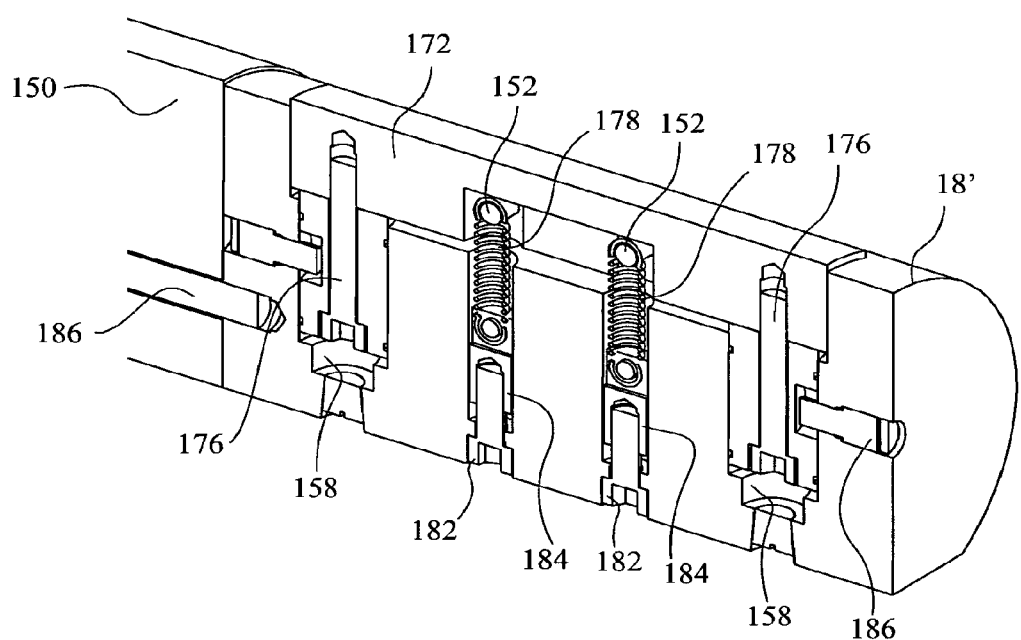
FIG. 3F is a perspective view of the parts shown in FIG. 3A.

In FIGS. 3 to 3F, an internal steady apparatus 18' of the presently described embodiment is shown and comprises a pneumatic (or hydraulic) actuator designed to push a wear pad 172 against the inside of the workpiece and push the spindle head 20' against the opposing side. This ensures a consistent depth of material removal, increases stiffness, and reduces vibration of the spindle head/tool. The steady apparatus 18' has a housing 150 which can be of any suitable cross-sectional shape. Two pistons 174 with double O-ring seals connect/bridge the wear pad 172 and are locked in place with cap head screws 176. The wear pad 172 uses a housing 150 (see FIG. 3A) and the pistons 174 to keep ridged while operating. The actuation distance is very small and the wear pad 172 is a good fit in the housing 150 to relieve the pistons 174 of any strain during the constant side forces during operation. The wear pad 172 is retracted by two compression springs 178 once a zero pressure situation occurs at the base of the piston 174. Preload to the correct level is achieved by turning a bolt 182 and pulling a spring holder 184 down to increase stretch in springs 178. If the system was to be pressurized while outside the bore of the workpiece, two stop pins 186 prevent the pistons 174 and wear pad 172 from being pushed clear of the housing 150. The adaptor plate 32' that fastens the spindle head 20' and the steady apparatus 18' together also ensures that the cross drilled passageways are correctly aligned. FIG. 3A shows an example of an internal steady apparatus for a workpiece that is internally circular.

One end of the springs 178 is held by a pin 152 and the other end is held by a pin 154. Plugs 156 plug recesses 158 beneath the pistons 174. Fluid (e.g. air) for moving the pistons 174 enters via inlets 161. O-ring seals 162 seal piston/housing interfaces.

Bolts 166 bolt an adaptor plate 32' to the steady apparatus 18'. The adaptor plate is bolted to the spindle head 20' by studs 151 received in the spindle head 20 and nuts 167 thereon. Fluid enters an inlet 250 from the cross-drilled passageways of the extension tubes 14' and the fluid is channelled to the passage 251 that connects all the pistons in the steady apparatus 18' to activate them.

It is within the scope of the present invention to use any steady apparatus which will maintain a constant depth for a tool bit 114, reduce or eliminate vibration, counter twist (torsional wind up) and/or maintain the system under light tension to reduce natural sag.

A second embodiment of the long reach spindle drive system is described below with reference to FIGS. 4-12. Amongst other differences, the second embodiment comprises variations of the bearing housings and steady assemblies of the first embodiment.

Figure 4:
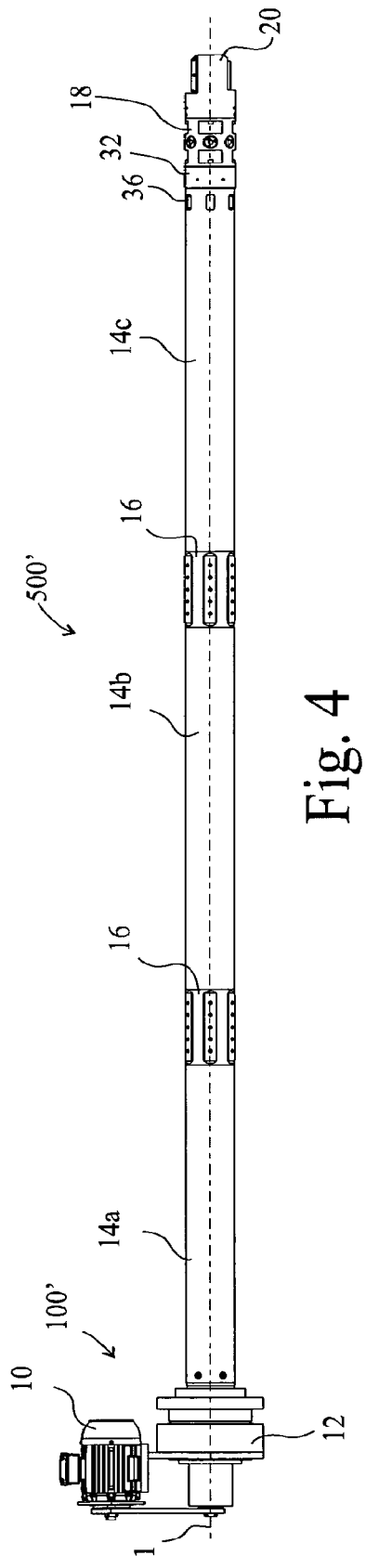
FIG. 4 is a schematic of a second embodiment of the long reach spindle drive system.

FIG. 4 shows a schematic diagram of the long reach spindle drive system 100', 500'. The drive system comprises a motor 10, a clamp housing 12, extension tubes 14a-c, bearing housings 16, a steady apparatus 18 and a spindle head 20. The extension tubes 14a-c are separated from one another by the bearing housings 16. In the embodiment disclosed in FIG. 4, the extension tubes 14a-c consist of a motor extension tube 14a, an intermediate extension tube 14b and a milling extension tube 14c. The extension tubes 14a-c are housing sleeves which envelop line shafts 22a-c (see FIG. 5). Akin to the nomenclature of the extension tubes 14a-c, the shafts consist of motor shaft 22a, an intermediate shaft 22b and a milling shaft 22c. Although the embodiment disclosed in the foregoing description comprises three extension tubes 14a-c and shafts 22a-c, the skilled reader will understand that the present invention is not limited to this case, such that in alternative embodiments the invention may comprise a number n of extension tubes and shafts, and for the case where n>1, the invention further comprises (n−1) bearing housings 16 separating the extension tubes and shafts.

Figure 5:
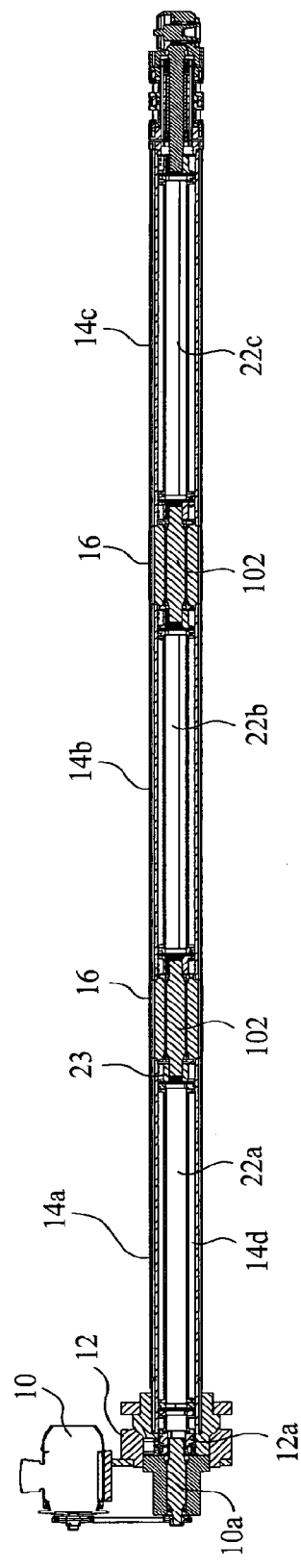
FIG. 5 is a sectional side view of the drive system of FIG. 4.

From the sectional view of the drive system shown in FIG. 5, it can be seen that the motor 10 has a rotary output 10a which has a non-circular constant cross section and engages with a socket in a clamp assembly 12a disposed within the clamp housing 12. The clamp assembly 12a is fixed to a proximal end of the motor shaft 22a and permits vibration-free and substantially inelastic transfer of torque from the rotary output 10a to the motor shaft 22a.

Figure 6:
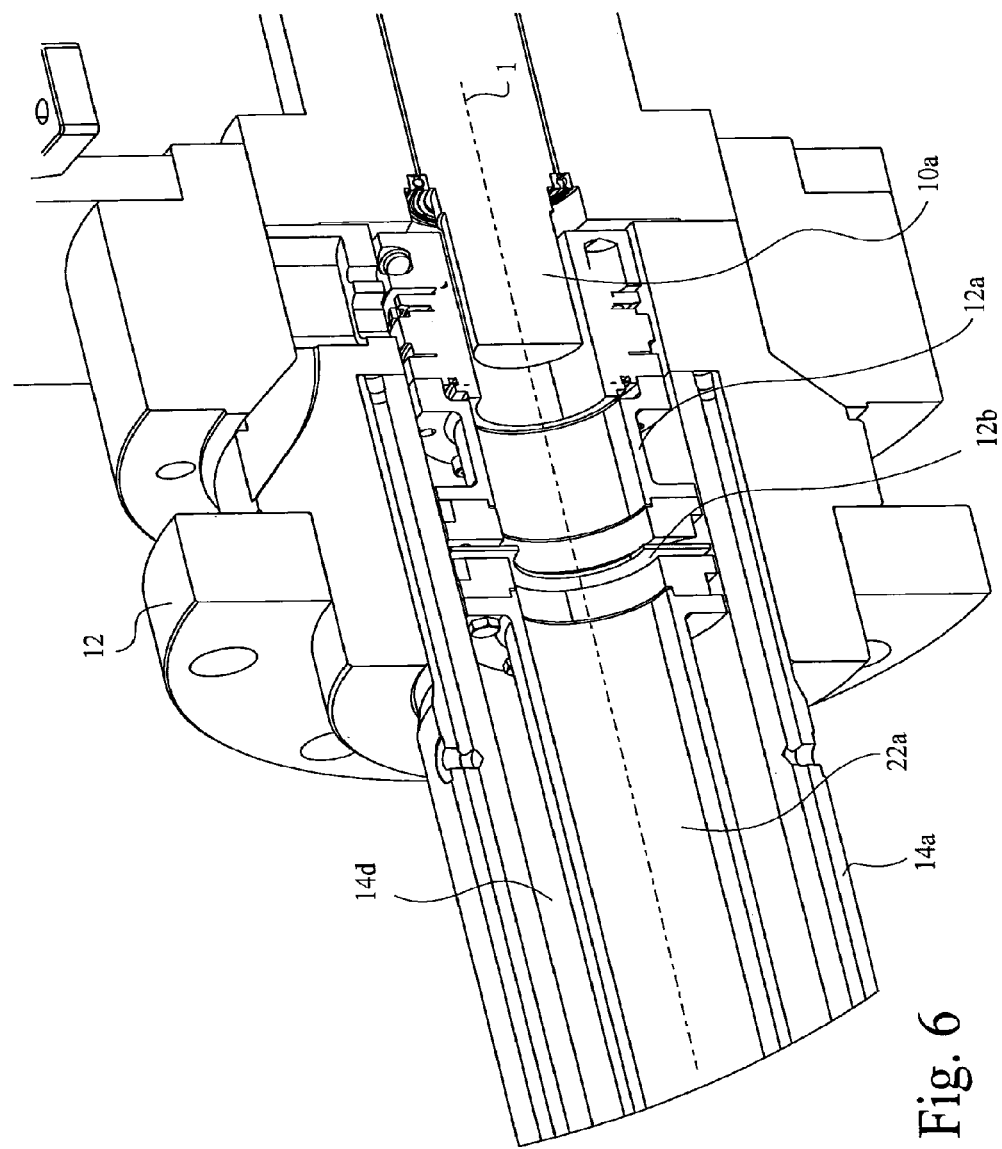
FIG. 6 is a sectional perspective view of a clamp housing and clamp assembly of FIG. 4.
Figure 7:
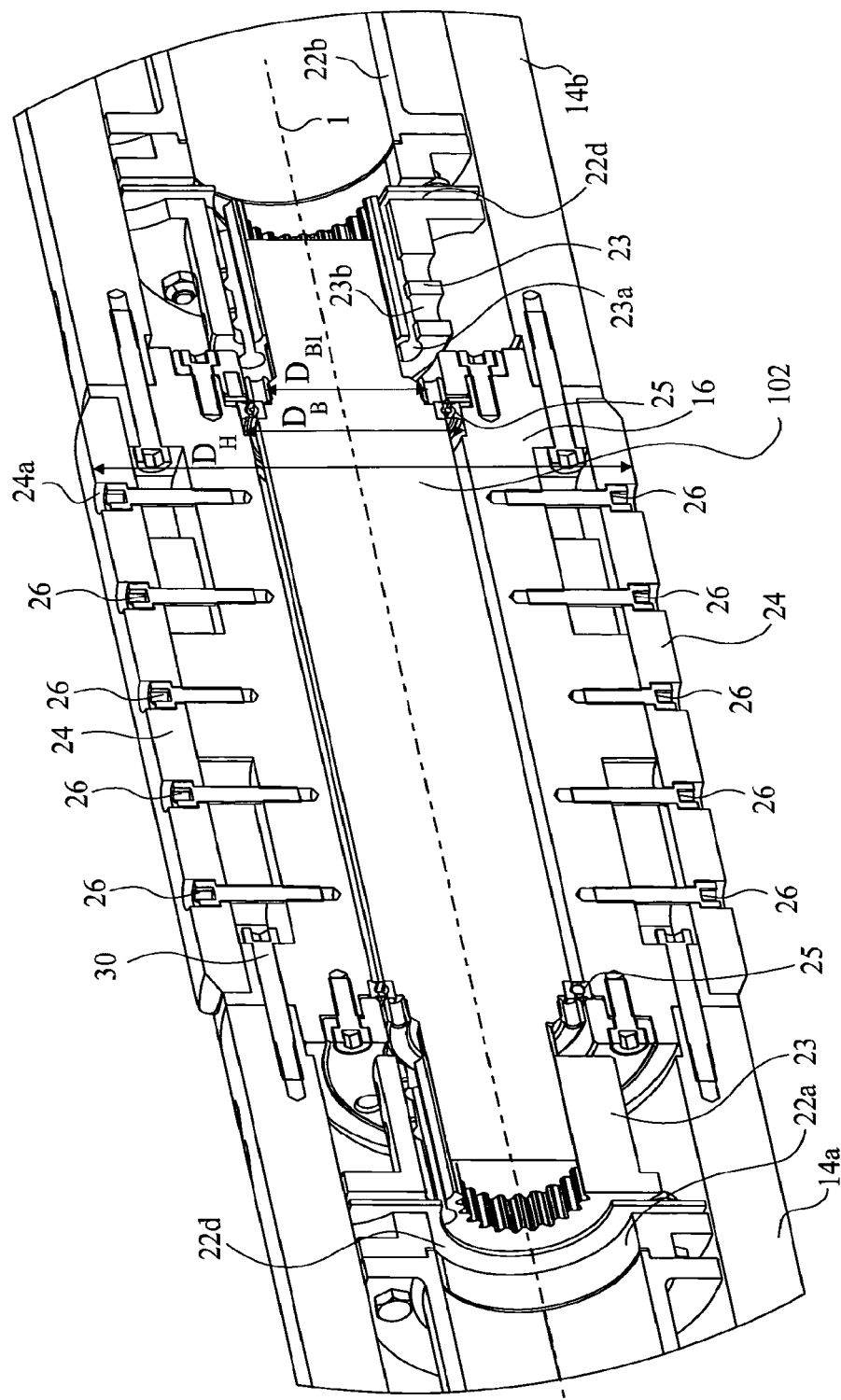
FIG. 7 is a sectional perspective view of the bearing housing and plane shaft of FIG. 4 connecting two extension tubes and shafts respectively.

FIG. 6 gives a more detailed view of the clamp assembly 12a. Preferably, an angularly flexible coupling 12b is employed comprising a hollow laminar disc alternately clamped to the line shaft 22a and clamp 12a. In addition, the clamp assembly 12a may comprise mechanical and/or electrical means to monitor and limit torque that is transferred to the motor shaft 22a. For example, a torque limiter (not shown) may be incorporated to prevent an overload situation and thus prevent damage to components down the transmission line.

The shafts 22a-c comprise hollow cylindrical tubes and extend away from the clamp assembly within the bores 14d of the extension tubes 14a-c. For the purpose of angular rigidity, these are as large a diameter as possible, which enables them to be constructed as relatively thin-walled tubes. At a distal end, relative to the clamp assembly 12a, the motor shaft 22a comprises a shaft coupling 23 (see FIG. 7) which receives one end of a plane shaft 102 which is disposed within the bearing housing 16. The plane shaft 102 has a non-circular cross section and engages with the complimentary shaft coupling 23 such that they are drivingly connected allowing torque to be transferred from the rotating motor shaft 22a to the plane shaft 102 without slipping. In the embodiment disclosed in FIG. 7, the ends of the plane shaft 102 are splined where the splines engage with complimentary grooves in the ends of the shafts 22a-c. Axial arcuately-sectioned bore 23a thins the wall of the coupling 23 near the splines of the shaft 102. Threaded bores 23b intersect the axial bore 23a and permit grub screws (not shown) to clamp the thinned wall on the plane shaft 102, removing any slack in the rotary connection between them, while still retaining concentricity. Radial bores in the wall of the extension tubes permit access of a key to operate the grub screws.

The plane shaft 102 is journalled for rotation within a bore of the bearing housing 16 by bearings 25. Bearing retainers may hold the bearings 25 in place. The bearing housing 16 is sealed to prevent unwanted material entering and disrupting operation. The bearings are small, considering the size of the components being supported. However, this is surprisingly necessary for two reasons. Firstly, the forces to be absorbed by the bearings are minor, comprising essentially just the weight of the line shafts 22 and the plane shaft 102. Secondly, large bearings require large preloads in order to take up inevitable backlash. Consequently, small bearings can absorb the minor forces being generated and secondly require less preload which means they are relatively freer running. While the bearings are small, however, that only means in terms of bulk, not of diameter, which is as large as possible to retain the angular rigidity of the system. Indeed, the bearings should not have the smallest diameter of any part of the drive system. Specifically, they should be larger than the couplings 23 which in the present embodiment have the smallest diameter and consequently the most potential twist for a given torque. Thus the bearings are preferably at least 50 mm in outside diameter with an outside to inside diameter difference of less than 10 mm. Indeed, in one embodiment, the outside diameter is 65 mm and the outside-to-inside diameter difference is 15 mm. However, this depends on the outside diameter $D_H$ of the bearing housing 16, such that the ratio R, of bearing outside diameter $D_B$ to bearing housing outside diameter $D_H$ is preferably between 30 and 60%. The bearing housing in the present example has an outside diameter of 150 mm (R=0.43). Moreover, the outside to inside bearing diameter difference $(D_B-D_{BI})$ is preferably between 10 and 30% of $D_B$ $((D_B-D_{BI})/D_B=0.23)$. Preferably, the bearing housing outside diameter $D_H$ is between 50 and 200 mm. This, of course, is also the internal diameter of the bore of the tube. The length (L) of the tube is preferably between 2 and 5 m, whereby the ratio of tool diameter to reach $(D_H/L)$ is between 1/100 and 1/10, preferably between 1/60 and 1/20.

The bearing housing 16 also comprises a plurality of contact plates 24 which are affixed to the outer surface of the bearing housing 16 by several screws 26. When the contact plates 24 are attached, the screw heads of the screws 26 sit deep within the screw holes 24a of the contact plates 24. The screws 26 are disposed radially in the screw holes 24a relative the tube axis 1. This provision gives the operator of the drive system the flexibility to reduce the thickness of the contact plates 24, by grinding for example, without interfering with the screws 26 and thus not affecting the secure attachment of the contact plates 24 to the bearing housing 16. An operator may wish to do this when fine-tuning the drive system to machine a workpiece with a particular internal diameter. Likewise, of course, the contact plates could be shimmed up to increase their diameter.

The bearing housings 16 are fixed to the extension tubes 14a-c by bolts 30 which are parallel the tube axes. The user can gain access to the bolts 30 via recesses 28 in the bearing housing 16. With the contact plates 24 screwed in place, the recesses 28 are covered by the contact plates 24 which prevent further access to the bolts 30.

The bearing housings 16 may further comprise cross-drilled holes that line up with similar passageways in the extension tubes 14a-c. The cross-drilled passageways connected through the extension tubes 14a-c and bearing housings 16 may be used for supplying cooling air to the spindle head 20 and to blow waste material clear of the tool bit to prevent the machining process from re-processing the waste material that would decrease tool bit life and increase power requirements. Lubricants may also be supplied to the spindle head 20, to keep running temperatures at an acceptable level and ensure adequate lubrication is provided throughout its running life. Electrical connections can be passed through to the spindle head 20 to connect transducers to measure torque/vibration or angle of twist of the assembly due to machining torque, or any other form of electrical control required at the head. In certain aspects, the spindle head 20 has an input/output ratio that suits optimum process requirements required for spindle speed and torque.

Figure 8:
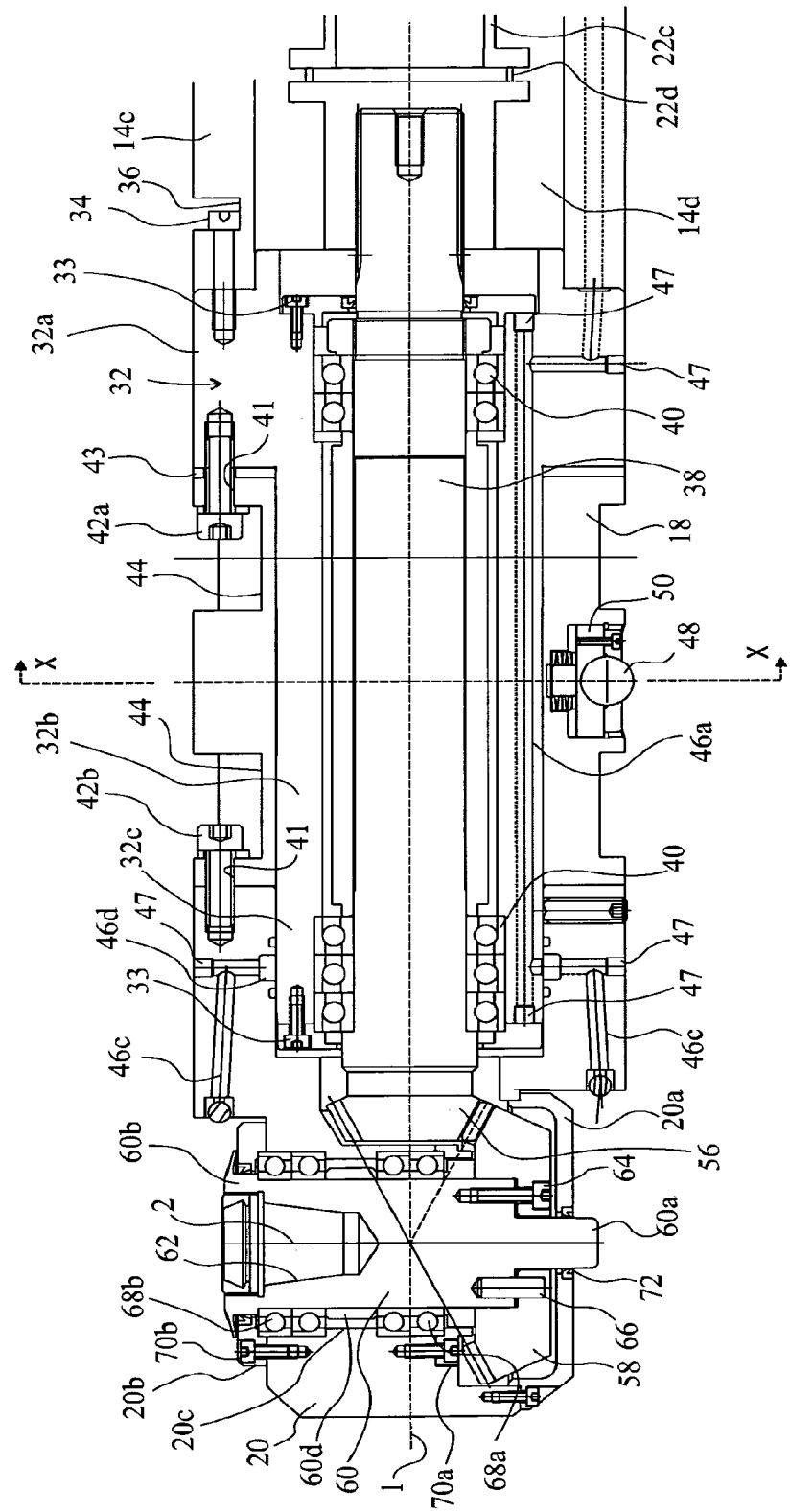
FIG. 8 is a sectional side view of an adapter plate, steady assembly and spindle head of FIG. 4.

In FIG. 8, it can be seen that the milling extension tube 14c connects to an adapter plate 32 by several bolts 34 (only a single bolt 34 is visible in FIG. 8). The bolts 34 can be accessed by the user via recesses 36 in the milling extension tube 14c. Within the milling extension tube 14c, the milling shaft 22c connects to a tool input shaft 38 by another angularly and axially flexible (but radially rigid) coupling 22d, like the coupling 12b described above between the motor shaft 22a and motor output 10a. Indeed, there is ideally such a coupling between each line shaft 22 and bearing shaft 102. The tool input shaft 38 has a non-circular constant cross section (splined, for example) and engages in a complimentary coupling 23 of the milling shaft 22c such that the two 38, 22c are drivingly connected (clamped as with grub screws and arcuate slot (not shown), as described above). The adapter plate 32 has an internal diameter greater than the external diameter of the tool input shaft 38 but less than the outer diameter of the milling extension tube 14c. The adapter plate 32 comprises a first section 32a, a second section 32b and a third section 32c. The first section 32a has an outer diameter substantially equal that of the milling extension tube 14c. The second section 32b extends from the first section 32a along the length of the tool input shaft 38 and has an outer diameter less than the first section 32a. The tool input shaft 38 is journalled for rotation within a bore of the adapter plate 32 by two sets of collar bearings 40. The adapter plate 32 has screws 33 which retains the collar bearings 40, allowing them to be preloaded as desired.

When assembling the system, the steady apparatus 18 is slotted over the second section 32b and attached to the first section 32a with bolts 42a (only one such bolt 42a is visible in FIG. 8). A spacer (or shim) 43 separates the steady apparatus from the first section 32a and is held tightly therebetween by bolts 42a. Once the steady apparatus 18 is attached to the adapter plate 32, the spindle head 20 may be installed onto the remaining, third section 32c of the second section 32b protruding from the steady apparatus 18. The spindle head 20 is attached to the steady apparatus by bolts 42b (only one such bolt 42b is visible in FIG. 8). Bolts 42a,b may by accessed by the user through recesses 44 in the surface of the steady apparatus 18. Note that the spindle head 20 is affixed to the steady apparatus 18 only and is not directly bolted to the adapter plate 32, such that if the bolts 42a were not present, the spindle head 20 and steady apparatus 18 would be free to collectively rotate about the tube axis 1 relative the adapter plate 32.

In the embodiment disclosed in FIG. 8, the adapter plate 32 comprises passageways 46a which connect cross drilled passageways 46b of the milling extension tube 14c to cross drilled passage ways 46c of the spindle head 20. Passage ways 46a-c may be formed by drilling, where ends may be sealed by seals 47 to create the desired passageway path. That path includes a circular groove 46d in the spindle head 20 surrounding the third section 32c of the adaptor plate. Thus drillings 46a can connect with the passageways 46c, regardless of the relative rotational orientation of the spindle head to the adaptor plate around the axis 1 of the tool input shaft 38.

The steady apparatus 18 is independent from the system of passageways 46a-c. The steady apparatus serves to push a plurality of ball bearing contacts 48 against the inside of the workpiece and push the spindle head 20 against the opposing side. This ensures a consistent depth of material removal, increases stiffness, and reduces vibration of the spindle head 20 and tool. The steady apparatus 18 is better understood with reference to FIG. 9.

Figure 9:
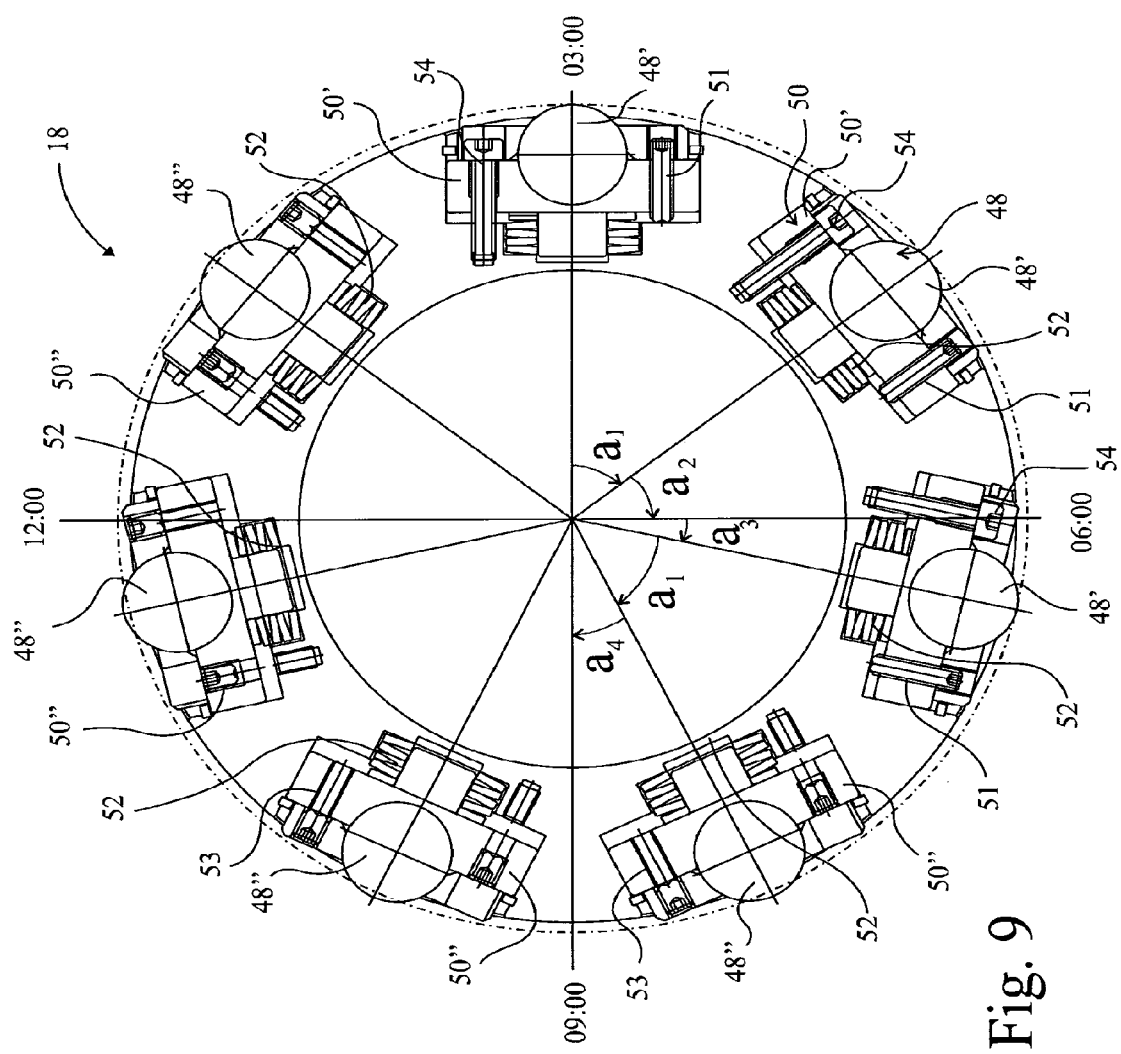
FIG. 9 is a section view along line X-X of the steady assembly of FIG. 8.

In FIG. 9, the ball bearings 48 are mounted in sockets 50 which are loaded onto springs 52. Sockets 50' are retained by screws 54 and are prevented from radial movement of the sockets 50 and ball bearings 48' therein by grub screws 51 that selectively increase the apparent thickness of the sockets 50'. Conversely, remaining ball bearings 48" are free to move radially with their respective sockets 50" on springs 52 because grub screws are missing or withdrawn from the corresponding bores 53 in the sockets 50". It is desirable that a fixed ball bearing 48' contacts the inside of the workpiece in opposition to the tool head to resist movements thereof. The ball bearing arrangement shown in FIG. 9 is such that forces perpendicular to the tube axis 1 arising from the tool bit working on the workpiece, are rigidly resisted from the approximate 10:00 position indicated.

For reasons explained further below, the rotational position of the steady apparatus 18, which is also referred to as a gauge means, about the axis 1 on the adaptor plate 32 is arranged to be infinitely variable. At least, it is in the sense that the ball bearing contacts 48 are disposable in any (or at least, many different) angular orientations with respect to the adaptor plate. The screws 42a, 42b that clamp the steady apparatus 18 to the adaptor plate 32 are disposed in bores in the adaptor disposed on four quadrants 12:00, 03:00, 06:00 and 09:00. The steady apparatus 18 of FIG. 9 has seven equally angularly spaced ball bearing contacts 48, separated from each other by 51.4°, meaning that there are five different angles between any contact 48 and a quadrant, namely, 0°, $a_1$=51.4°, $a_2$=(90−51.4)=38.6°, $a_3$=(2$a_1$−90) =12.9, and $a_4$=(90−$a_1$−$a_3$)=2$a_3$=$a_1$/2=25.7°. Thus, if the apertures 41 in the steady apparatus through which the screws 42a,b are received are arcuate, centred on the axis and permit a minimum of 12.9° of adjustment, all angular positions of the steady apparatus with respect to the adaptor 32 can be achieved. Indeed, in the general case, where there are m screws 42b and x ball bearings 48, then the minimum circumferential extent p of the arcuate slots 41 is given by p=360°/($f_1$(m,x)), where $f_1$(m,x) is some function based on the values of m and x that returns the number of possible different orientations of the steady apparatus 18 with respect to the tool head 20 and its tool holder 60.

Likewise, the minimum circumferential extent q of the arcuate slots 41 through which n screws 42b pass depends on a number of factors including the extent p determined already and the number m and n of screws 42a,b. However, the skilled person can determine what is required in order to achieve both any angular orientation of the tool bit output 60 with respect to the adaptor plate 32 and hence with the end sleeve 14, and any angular orientation of the ball bearings 48 with respect to the tool bit output 60.

Both of these adjustment possibilities exist for the reasons explained below. However, returning now to FIG. 8, it can be seen that the tool input shaft 38 terminates within the spindle head 20. At the terminating end of the input shaft 38, a first helical bevel gear 56 engages with a complimentary second helical bevel gear 58 on the tool output shaft 60. The tool output shaft 60 is disposed parallel to a tool axis 2 within the spindle head, and is perpendicular with respect to the tool input shaft 38 and tube axis 1. The second bevel gear 58 is fixed to the lower end of the tool output shaft 60 by a screw 64 and dowel 66. Together, the screw 64 and dowel 66 respectively prevent unwanted axial and shear movement of the bevel gear 58 relative to the tool output shaft 60. The tool output shaft 60 is journalled for rotation by two pairs of bearings 68a,b within the spindle head 20.

A lower end 60a of the tool output shaft 60 is set in an aperture 72 of the lower portion 20a of the spindle head 20. The two pairs of bearings 68a,b are held in place and preloaded by sets of washers and associated screws 70a,b. The washers 70a,b squeeze between them the outer races of the bearings 68a,b against an inner flange 20c of the spindle head 20. The inner races are squeezed between a flange 60c of the output shaft 60, a spacer 60d and the bevel gear 58. However, a spacer 58a intervenes and determines the axial position (in relation to the axis 2 of the tool output shaft 60), of the bevel gear 58. This is important so that the gear 58 meshes precisely with the bevel gear 56. Indeed, by the same token, the thickness of the spacer 43 determines the axial position (in relation to the axis 1 of the tool input shaft 38), of the bevel gear 56. The tool output shaft 60 has an upper end 60b which protrudes through an upper portion of the spindle head 20. The upper end 60b comprises a tool spindle 62 for securely receiving a tool bit and transferring torque to it. The connection thereof is known and need not be explained further.

Figure 10:
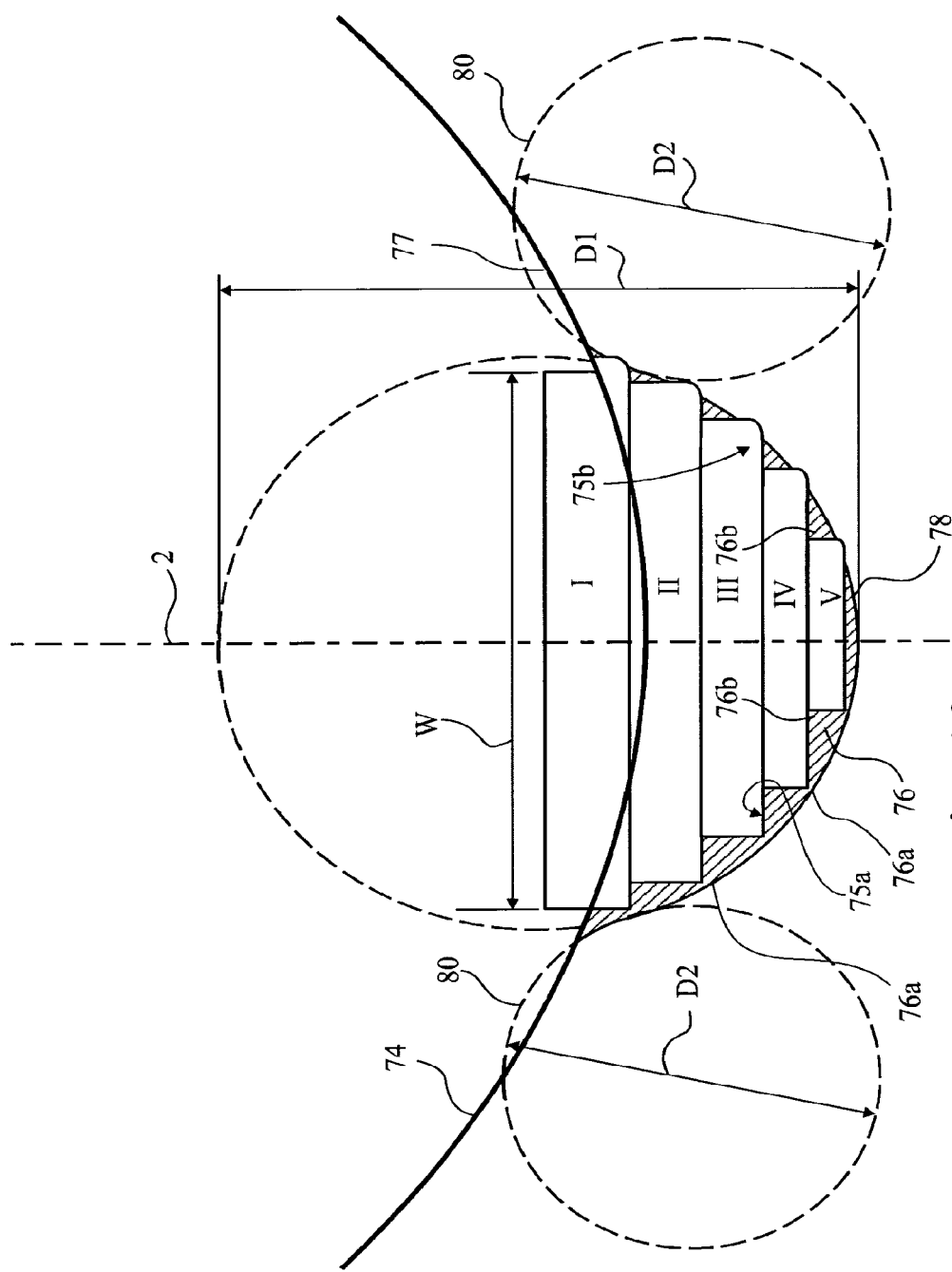
FIG. 10 is a diagram illustrating the tool bits and method for machining a groove on the inner surface of a workpiece.

One method for working the inside surface 74 of the workpiece is best understood with reference to FIG. 10. The workpiece (a hollow steel cylinder, which is to form the stator of a progressive cavity pump or motor) is inserted over the spindle head 20 and extension tubes 14a-c. In one embodiment, the ball bearings 48 score or indent the inner surface 74 of the workpiece as the workpiece is passed over them. So that the scoring is beneficial for future passes of the workpiece over the ball bearings 48, it is preferable that the workpiece be rotated about the tube axis 1 as it is inserted onto the extension tubes 14a-c. Provided this is done, the scores will act to guide the workpiece over the ball bearings 48 in subsequent working passes explained further below, the scores forming tracks to be repeatedly followed by the balls 48. When the workpiece is in place, the long axis of the workpiece (the "workpiece axis") is substantially concentric with the tube axis 1 and the spindle head 20 protrudes from the open end of the workpiece at the opposite end proximal the motor 10.

A first shallow and broad milling tool bit I (FIG. 10) is then inserted into the tool spindle 62 and fixed in place and the motor 10 is switched on. With the tool bit I spinning, the tool 100', 500 is translated along the tube axis 1 in a direction away from workpiece, and the workpiece is simultaneously rotated about the tube axis 1. First milling tool bit I has a thickness T and width W and has a rectangular cross section when viewed perpendicular to the tool axis 2 (although see also below). As the workpiece is translated with respect to the tool bit I, the bit I mills a helical groove in the inner surface 74. After the first pass, i.e. when the tool bit has been translated such that a groove has been milled from one end of the workpiece to the other, the tool bit I is removed, the workpiece is once again placed over the extension tubes 14a-c, and the bit I is re-inserted prior to performing the second pass. It should be noted that the tool bit might not necessarily be removed and reinserted after the tool 100', 500 has been relocated in the workpiece. Instead, the tool could simply be tracked back up the workpiece with the tool bit I following the course of the groove made during the preceding milling operation. Indeed, in that event, the motor will continue to operate to ensure that the tool bit does not jamb. The workpiece could be indexed round the axis 1a small amount to accommodate two potentially desirable effects. The first might be so that the tool bit tracks centrally down the groove cut, bearing in mind that, however torsionally stiff the line shafts 14 are, there will inevitably be some twist of them during machining that will need to be accommodated on the return pass (where there will be no corresponding twist to keep the bit central). The second might be to ensure that a cut is, in fact, made on the return pass. This may be just a small amount to ensure that there is not merely some rubbing of the tool against previously milled surfaces, since this will have the effect of dulling the tool bit's edge.

In fact, in principle, there is no reason why the return path cannot make a full cut of a new groove. However, if this is arranged, then there will need to be support elements put in place to keep the line shafts 14 straight and concentric with the axis 1. These support elements would need to be removable as the motor 10 progressed axially with respect to the workpiece. Adjacent the workpiece, the support element would need to extend 360° around the axis 1 in order to support the tool head in all directions and ensure only one degree of freedom, in the direction of the axis 1. However, a hinged clamshell-type arrangement would be one possible arrangement.

Both the foregoing options (of retracking the tool bit down its groove or cutting a new groove in the reverse direction) are only suggested for the purpose of efficient use of time and are not essential to the present invention. What is essential is returning the tool to its start position so that it can make second and further passes through the workpiece.

During the second pass, the tool I mills an identical groove to the first but at a different circumferential location in the surface 74 of the workpiece. Subsequent passes produce the required number of grooves and lobes, which, with a seven ball 48 support, will be seven grooves. Once all passes have been performed with tool bit I, the process is repeated with tool bit II. Tool bit II is smaller in thickness and width in comparison to tool bit I, but penetrates further (ie radially more distant from axis 1) into the workpiece. Repeating the process with tool bit II deepens the depth of the grooves increasing the relative height of the lobes 80 between them (see FIG. 11). Similarly, further passes with subsequent tool bits III to V removes material to form a step-like groove 75*a* in the inner surface 74. The remaining material 76 (shaded in FIG. 10) can be removed by an additional pass with a suitably shaped tool bit to form the final profile 78. The resulting circular section groove 78 has ("major") diameter D1, and is circumscribed by protruding circular lobes 80 of ("minor") diameter D2. Indeed, the profile of the lobes 80 is such that the circle of diameter D2 intrudes into the surface 74 of the workpiece so that a "flat" crown 77 is formed on each lobe 80. It is not, of course, flat at all, but has the profile of the original bore 74. It is only flat in the sense of being equisdistant from the centre of rotation, axis 1.

Although it could be conceived that a single pass with an appropriately shaped tool bit would create the desired grooves 78 and lobes 80, such a method would put huge demands on the tool bit and would produce a large amount of long swarf, the efficient removal of which may be problematic. While the embodiment disclosed in FIG. 10 uses tool bits I-V, having rectangular cross sections, the skilled person will appreciate that other embodiments will encompass the use of tool bits with different cross sections to produce the desired profile 78, 80. Indeed, tool bit V may be arranged also to remove the shaded part under it, since, to have a tool bit that is wide enough to remove the triangles of material adjacent the lobes 80, it will either have to rotate too fast to remove them efficiently, or too slowly to remove the central part (under tool bit V).

Although FIG. 10 shows the tool bits I-V as having a rectangular section and leaving continuous ligaments 76*a* between each step produced by each tool bit, neither of these is preferred. On the right of FIG. 10, the profile of the tool bits I-V is different in two respects from the profiles on the left. Firstly, the diameter W of each tool bit is larger, so that they protrude into, and result in some of, the final profile 78. The effect of this is explained below. Secondly, the corners of each tool bit are not sharp but smoothly contoured so that the internal corners of the profile 75*b* after all the tool bits I-V have passed are smoothly curved. Again, the effect of this is explained further below.

Also, although the tool bits I to V are described as being radially transverse in the holder 60, rotating about radially transverse axis 2, there is a case for inclining the tool bit rearwardly. The effect of such inclination is to remove the point of zero motion (the centre of rotation of each tool bit), from contact with the workpiece. Consequently, although the tool holder 60 is shown radial with respect to the common axis 1 of the tool head, it could with perhaps some advantage be inclined.

Indeed, of course, it is to be noted that the motor is variable speed so that the tool rotates at an appropriate speed for the task in hand. It is to be noted, in any event, that the gear 56/58 is speed reducing. This has several effects. The first is that it reduces the torque loading on the drive train up to the tool output shaft, whereby the load on the bearings 25 is reduced. As a result of the reduced torque, there is less twist so that the line shaft appears stiffer and as reduced torsional vibration which improves tool life. It also means that the diameter of the bevel gear 56 is small, meaning that the gear 58 can be closer to the axis 1 and is less likely then to protrude into the solid section of the workpiece.

Figure 11:
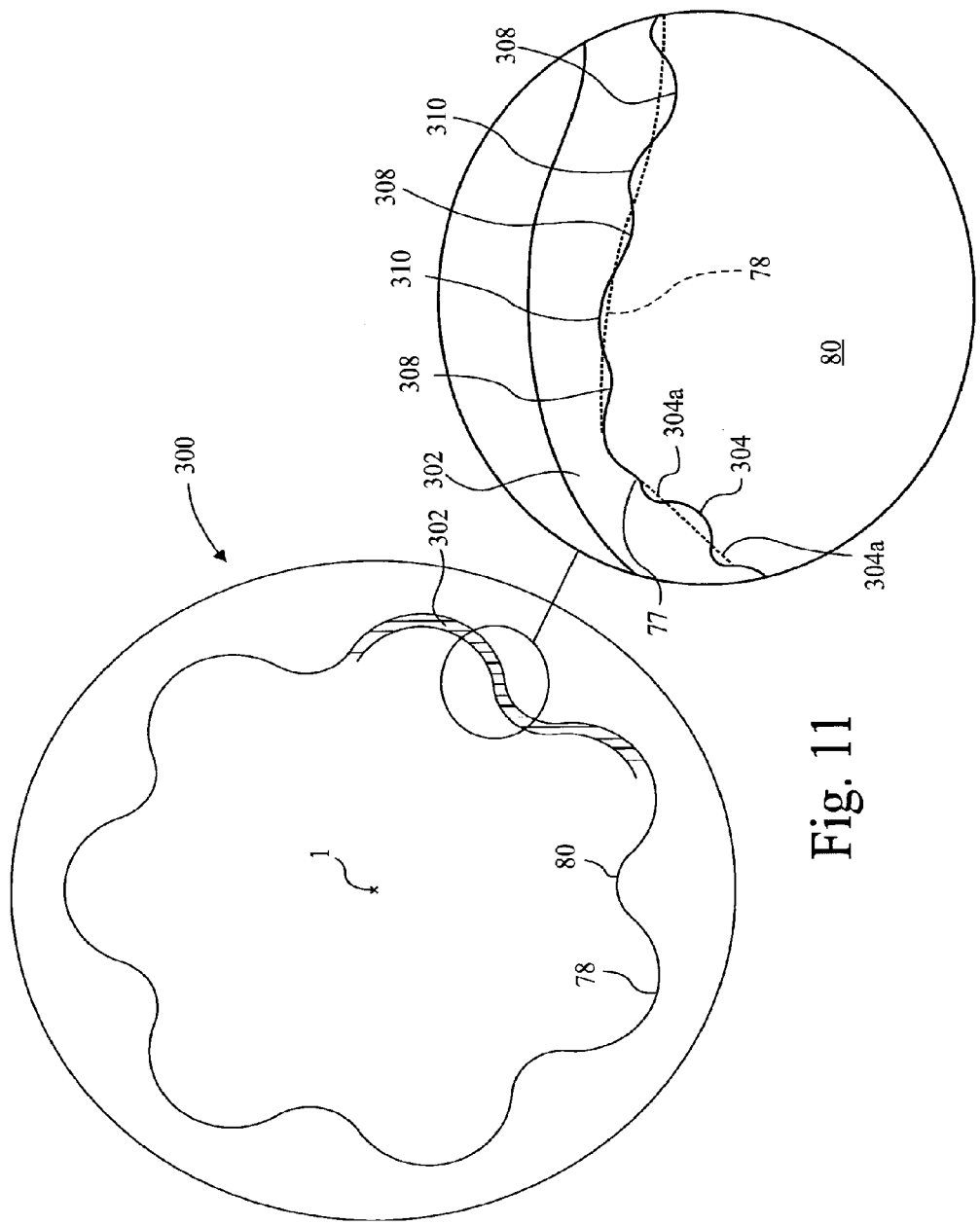
FIG. 11 is a cross-section view a workpiece subsequent to machining.

FIG. 11 shows an example cross section of a workpiece 300 looking down the workpiece axis 1. The grooves 78 and lobes 80 are clearly visible. Indeed, the workpiece may be destined to form the stator of a mud motor or other progressive cavity machine and may ultimately be coated with a layer 302 of elastomeric material that cushions and seals contact between a rotor (not shown) and the stator 300. In the inset to the drawing is shown an enlarged part of a lobe 80. The layer 302 may be affixed by any convenient means but current procedures involve the deposition of a layer of primer followed by a layer of adhesive prior to application of the elastomer. It is well known that sharp external corners of solid objects bleed liquids applied to the object away from the corner, so that, in the case of adhesives, insufficient adhesive may be present to effect a strong bond at such sharp edges. It is also well known that sharp indents cause liquids to pool in the indents. In the case of adhesives, this may have the effect of preventing proper curing or increasing the depth of the adhesive, either of which may result in ineffective bonding. On the other hand, it is also known that the greater the surface area, and the rougher the surface area, the better the strength of bond can be.

It is for these reasons therefore that the curved profile 75*b* is preferred. Furthermore, while the bottom corner 308 of each tool bit I-V is smoothly curved, (thereby preventing pooling of adhesive), it also penetrates into "final" profile 78. This means that at no time do any ligaments 76*a* join adjacent triangles 76*b*. Therefore the formation of long swarf particles is avoided when the final tool bit removes the triangles 76*b*. The actual final profile may also leave curved peaks 310 between the corners 308 which, again, are not sharp enough to cause depletion of adhesive. Nevertheless, they are significant enough that, with the corners 308, there is an increase in the surface area of the tube for bonding to the elastomer layer 302. So, not only does the present invention provide an effective method for forming the helical channels 78 of a stator, but may also improve the strength of attachment of the elastomeric layer when that is adhered to it. Indeed, the peaks 310 and corners 308 define undulations in the flanks of the lobes 80.

The inset to FIG. 11 also shows a dent 304 in its crown 77 that is caused by repeated tracking of the balls 48 as the tool is drawn back and forth through the stator 300. This dent is important in the machining process described above.

When the tool is first inserted in the bore, at least one, and possibly several more, trial passes are made of the tool so that the balls 48 do indent tracks 304 in the bore. These dents not only penetrate the surface 77 but also swage out a lip 304a on either side. The precise dimensions of the dents and lips can be determined based on simple calculations knowing the hardness of the materials of the balls 28 and tube 300, as well as the forces exerted by the springs 52. However, more importantly, the dents and lips resist twisting of the tool while it is cutting the profile 78. The reaction of the tool bit is circumferential with respect to the axis 1 and so the balls must ride up over the lips 304a compressing the springs 52. The forces required to cause any movement up the lips is of course, substantial, so that this effect causes the torsional rigidity of the tool to be significantly increased.

Incidentally, because the dent 304 has the radius of the balls 48 it does not cause pooling of the adhesive when that is alter applied. Nor are the lips 304a sharp to cause depletion. Consequently, these features also promote strong adhesion of the elastomeric layer to the bore of the stator 300.

Turning back to FIG. 8, the spindle head 20, steady apparatus 18 and adapter plate 32 are all rotatable about axis 1 with respect to one another. This freedom of rotation is such that all combinations of configurations are possible with respect to the orientation of the spindle head 20 and ball bearings 48 of the steady apparatus 20. This is important in establishing the most efficient damping and hold of the workpiece. The orientation of the ball bearings 48 with respect to the configuration of the tool is also important since it is desired that the ball bearings 48 contact and ride along the lobes 80 created when machining the inner surface 74 of the workpiece.

Likewise, the adjustability of the adapter plate 32, steady apparatus 18 and spindle head 20 relative the bearing housings 16 allows the lobes 80 to contact the contact plates 24 providing support for the workpiece. It is preferable that each contact plate 24 is in contact with at least two lobes 80 at any one time when machining. FIG. 12 shows the paths 72 of the lobes 80 passing over the contact plates 24 of the bearing housing 16 as the workpiece is translated on its along the tube axis 1 and simultaneously rotated about the tube axis 1.

In operation of the tool, it may be desirable that the tool bit can be oriented at any angle with respect to the workpiece, without having to disturb the clamp 12, 12'a. Thus, it may be that pressing the tool bit to one side, or vertically upwardly, clears swarf most effectively. Secondly, it is desirable that the number of grooves, their pitch and their lead should all be selectable according to the requirements of the eventual apparatus, be that a progressive cavity pump or motor or other apparatus. Thus the number of grooves determines the number of lobes between them, and hence the number of gauge elements 48. Since there is inevitably an axial separation between the tool and the steady apparatus 18, then the angular position of the steady apparatus must be closely correlated with the pitch and lead of the helical grooves, which of course are determined by the number of grooves (at least in the case of the pitch) and the relative rate of rotation of the tube around the tool and the rate of draw of the tool through the tube.

Alternative embodiments may have graduations on any or all of the spindle head 20, steady apparatus 18 and adapter plate 32 to assist the user in establishing the desired configuration thereof in relation to the pitch P of the helical grooves 78 and their lead L, being the length of a single complete rotation of a given groove 78.

Certain embodiments of the present invention provide one, some, or all of the following:
a. Rigidly held line shafts supported at intervals;
b. Bearing housings providing support to keep line shafts straight;
c. Increased rotational speed due to a. and b. above;
d. Increased shaft Polar second moment of area compared to a small diameter solid shaft;
e. Increased torque transmission;
f. Increased stiffness for shaft;
g. Increased power;
h. Reduced mass moment of inertia;
i. Accommodation of bending and misalignments (lateral/axial/angular);
j. Differential thermal expansions are accommodated (by line shafts);
k. Services are connectible through cross-drilled passageways;
l. Ease of manufacture for short sections to tight tolerances is possible ensuring a good fit in a workpiece and increasing stiffness and lower vibration during machining (increasing tool life);
m. Ease of assembly/maintenance;
n. Sections can be added or removed in line with workpiece length;
o. Internal steady apparatus reduces vibration and increases consistency of cutting depth; and
p. The line shaft has the flexibility to accommodate axial (caused by thermal effects) and angular (caused by head movement and bend) misalignment, and can be used to help with spindle head design in smaller cross-sections, to move the centre of rotation of the spindle head away from the axis of the PTO.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step is to be understood as referring to all equivalent elements or steps. It is intended to cover the invention as broadly as legally possible in whatever form it may be utilized.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A stator for a progressive cavity machine, the stator comprising:
    a tube having a central axis, a radially inner surface, and a radially outer surface, wherein the radially inner surface comprises a plurality of lobes and a plurality of troughs, wherein each trough is circumferentially positioned between two of the lobes;
    wherein each lobe of the radially inner surface has a crown that includes an indentation; and
    an elastomeric layer disposed on the radially inner surface.

2. The stator of claim 1, wherein each lobe includes a flank extending from the crown to one of the troughs, wherein each flank includes undulations.

3. The stator of claim 1, wherein each crown includes a pair of raised lips circumferentially adjacent the indentation.

4. The stator of claim 3, wherein each indentation is disposed between the pair of raised lips on the corresponding crown.

5. The stator of claim 1, wherein the indentations are scores formed from a plurality of ball bearings.

6. The stator of claim 1, wherein the indentations are configured to guide the stator over a spindle head during formation of the troughs.

7. The stator of claim 1, wherein the indentations are configured to increase the surface area of the radially inner surface for bonding of the elastomeric layer thereto.

8. A stator for a progressive cavity machine, the stator comprising:
    a tube having a central axis, an outer surface, and an inner surface, wherein the inner surface includes a plurality of circumferentially-spaced parallel helical lobes and a plurality of circumferentially-spaced parallel troughs, wherein each trough is circumferentially disposed between two of the lobes;
    wherein each lobe of the inner surface of the tube has a radially inner crown;
    wherein a plurality of the crowns include an indentation, wherein the indentations are configured to guide the tube during formation of the troughs;
    an elastomeric layer coating the inner surface of the tube.

9. The stator of claim 8, wherein each crown includes an indentation.

10. The stator of claim 8, wherein the plurality of the crowns include a pair of raised lips circumferentially adjacent the corresponding indentation.

11. The stator of claim 10, wherein each indentation is circumferentially disposed between the corresponding pair of raised lips.

12. The stator of claim 10, wherein each indentation is configured to receive a ball bearing rotatably coupled to a spindle head.

13. The stator of claim 8, wherein each indentation is a score.

14. The stator of claim 8, wherein the indentations are configured to guide the tube relative to a spindle head during formation of the troughs.

15. A method for forming a stator for a for a progressive cavity machine, the method comprising:
    step (a) passing a tube over a spindle head a plurality of times, wherein the tube has a central axis, a radially inner surface, and a radially outer surface;
    step (b) scoring the inner surface of the tube with a plurality of ball bearings coupled to the spindle head to form a plurality of circumferentially-spaced indentations on the inner surface of the tube with the ball bearings during said step a;
    step (c) forming a helical groove in the radially inner surface of the tube with a cutting tool of the spindle head during each pass in said step (a) to form a plurality of helical grooves on the radially inner surface of the tube, wherein the plurality of helical grooves define a plurality of lobes and a plurality of troughs on the radially inner surface of the tube, wherein each trough is circumferentially positioned between two of the lobes, wherein each lobe has a crown that includes one of the plurality of circumferentially-spaced indentations formed during step (b);
    step (d) applying an elastomeric layer on the radially inner surface of the tube after said step (c).

16. The method of claim 15, further comprising forming a pair of raised lips on opposite circumferential sides of each indentation during said step (b).

17. The method of claim 15, further comprising:
    engaging the indentations with the ball bearings to guide the tube relative to the spindle head during each pass in step (a).

18. The method of claim 15, further comprising:
    step (e) passing the tube over the spindle head a plurality of times after said step (a) and before said step (d);
    step (f) engaging the indentations with the ball bearings to guide the tube relative to the spindle head during each pass in said step (e);
    step (g) increasing a radial depth of each of the plurality of helical grooves with the cutting tool of the spindle head during said steps (e) and (f).

19. The method of claim 15, wherein a raised lip is disposed on either side of each indentation.

* * * * *